(12) United States Patent
Nitsche et al.

(10) Patent No.: US 9,815,160 B2
(45) Date of Patent: Nov. 14, 2017

(54) PERCUSSION UNIT

(71) Applicant: Robert Bosch GmbH, Stuttgart (DE)

(72) Inventors: Rainer Nitsche, Kirchheim/Teck (DE);
Matthias Tauber, Bad Boll (DE);
Antoine Vandamme, Gerlingen (DE);
Gerd Schlesak, Tamm (DE); **Helge
Sprenger, Stuttgart (DE); Carsten
Diem, Ludwigsburg (DE); Wolfgang
Fischer, Gerlingen (DE); Haris
Hamedovic, Moeglingen (DE); Juergen
Lennartz, Ostfildern (DE); Christian
Bertsch, Markgroeningen (DE); Mario
Eduardo Vega Zavala**,
Schwieberdingen (DE); **Achim
Duesselberg**, Kirchheim/Teck (DE)

(73) Assignee: Robert Bosch GmbH, Stuttgart (DE)

( * ) Notice: Subject to any disclaimer, the term of this patent is extended or adjusted under 35 U.S.C. 154(b) by 429 days.

(21) Appl. No.: 14/403,576

(22) PCT Filed: Apr. 24, 2013

(86) PCT No.: PCT/EP2013/058460
§ 371 (c)(1),
(2) Date: Nov. 24, 2014

(87) PCT Pub. No.: WO2013/174599
PCT Pub. Date: Nov. 28, 2013

(65) Prior Publication Data
US 2015/0129248 A1 May 14, 2015

(30) Foreign Application Priority Data
May 25, 2012 (DE) .......................... 10 2012 208 870

(51) Int. Cl.
*B23B 45/16* (2006.01)
*B25D 9/00* (2006.01)
(Continued)

(52) U.S. Cl.
CPC .............. *B23Q 5/033* (2013.01); *B25D 11/00* (2013.01); *B25D 11/005* (2013.01);
(Continued)

(58) Field of Classification Search
CPC ......... B23Q 5/033; B25D 11/00; B25D 17/00
(Continued)

(56) References Cited

U.S. PATENT DOCUMENTS 3,468,383 A 9/1969 Kotone
4,300,083 A * 11/1981 Heiges .................. B06B 1/0261
318/128
(Continued)

FOREIGN PATENT DOCUMENTS

CN 1460047 A 12/2003
DE 100 14 314 A1 10/2001
(Continued)

OTHER PUBLICATIONS

International Search Report corresponding to PCT Application No. PCT/EP2013/058460, dated Aug. 8, 2013 (German and English language document) (8 pages).

*Primary Examiner* — Robert Long
(74) *Attorney, Agent, or Firm* — Maginot, Moore & Beck LLP

(57) ABSTRACT

A percussion unit for a rotary hammer and/or percussion hammer includes a control unit that is configured for open-loop and/or closed loop control of a pneumatic percussion mechanism. In at least one operating state in which the control unit changes from an idle mode to a percussion
(Continued)

mode, the control unit is configured to adjust at least one operating parameter temporarily to a starting value.

19 Claims, 13 Drawing Sheets

(51) Int. Cl.
*B25D 11/00* (2006.01)
*B25D 13/00* (2006.01)
*B25D 16/00* (2006.01)
*E21B 1/00* (2006.01)
*B23Q 5/033* (2006.01)
*B25D 17/00* (2006.01)

(52) U.S. Cl.
CPC .......... *B25D 16/006* (2013.01); *B25D 17/00* (2013.01); *B25D 2211/003* (2013.01); *B25D 2211/068* (2013.01); *B25D 2250/035* (2013.01); *B25D 2250/131* (2013.01); *B25D 2250/145* (2013.01); *B25D 2250/201* (2013.01); *B25D 2250/221* (2013.01)

(58) Field of Classification Search
USPC ........................................ 173/90, 2
See application file for complete search history.

(56) References Cited

U.S. PATENT DOCUMENTS

| | | | | |
|---|---|---|---|---|
| 5,154,242 | A * | 10/1992 | Soshin | G05D 17/02 173/178 |
| 5,715,894 | A * | 2/1998 | Maruyama | B25B 23/1456 173/180 |
| 5,918,685 | A * | 7/1999 | Ulbrich | B23B 49/006 173/15 |
| 6,158,929 | A * | 12/2000 | Fisher | G05B 19/19 408/1 R |
| 6,520,266 | B2 * | 2/2003 | Bongers-Ambrosius | B25D 11/12 173/115 |
| 7,204,322 | B2 * | 4/2007 | Sakai | B25D 11/125 173/117 |
| 2002/0003045 | A1 * | 1/2002 | Bongers-Ambrosius | B25D 16/00 173/201 |
| 2002/0050168 | A1 * | 5/2002 | Bongers-Ambrosius | B25D 16/00 73/584 |
| 2002/0129948 | A1 * | 9/2002 | Wursch | B23B 49/006 173/4 |
| 2003/0182016 | A1 * | 9/2003 | Fiebig | G05B 19/4083 700/168 |
| 2004/0182587 | A1 * | 9/2004 | May | B25B 23/14 173/2 |
| 2005/0000998 | A1 * | 1/2005 | Grazioli | B25B 27/0085 227/2 |
| 2005/0230130 | A1 * | 10/2005 | Strasser | B25F 5/00 173/2 |
| 2006/0076154 | A1 * | 4/2006 | Aoki | B25D 11/125 173/212 |
| 2007/0039749 | A1 * | 2/2007 | Aoki | B25D 16/00 173/201 |
| 2007/0040476 | A1 * | 2/2007 | Statnikov | B06B 3/00 310/323.18 |
| 2007/0068605 | A1 * | 3/2007 | Statnikov | C21D 10/00 148/558 |
| 2008/0289839 | A1 * | 11/2008 | Hricko | B25B 21/00 173/1 |
| 2009/0032275 | A1 * | 2/2009 | Ikuta | B25D 17/24 173/117 |
| 2009/0065226 | A1 * | 3/2009 | John | B25D 11/005 173/6 |
| 2010/0163260 | A1 | 7/2010 | Berger et al. | |
| 2010/0175903 | A1 * | 7/2010 | Ikuta | B25D 11/125 173/2 |
| 2010/0319994 | A1 * | 12/2010 | Wiercigroch | E21B 7/24 175/56 |
| 2011/0068141 | A1 * | 3/2011 | Wolf | B25C 1/08 227/9 |
| 2011/0101064 | A1 * | 5/2011 | Wolf | B25C 1/08 227/9 |
| 2012/0169256 | A1 * | 7/2012 | Suda | B25B 21/00 318/17 |
| 2015/0101835 | A1 * | 4/2015 | Nitsche | B25D 16/006 173/201 |
| 2015/0102084 | A1 * | 4/2015 | Zhao | B25C 1/08 227/10 |
| 2015/0129248 | A1 * | 5/2015 | Nitsche | B25D 16/006 171/1 |
| 2015/0136433 | A1 * | 5/2015 | Nitsche | B25D 16/006 173/2 |
| 2015/0196997 | A1 * | 7/2015 | McClung | B25B 21/026 173/93 |
| 2015/0202758 | A1 * | 7/2015 | Nitsche | B25D 16/006 173/1 |

FOREIGN PATENT DOCUMENTS

| | | | |
|---|---|---|---|
| DE | 100 33 362 A1 | 1/2002 | |
| DE | 101 45 464 A1 | 4/2003 | |
| DE | 102 12 064 A1 | 10/2003 | |
| EP | 2 189 249 A1 | 5/2010 | |
| FR | 2 915 124 A1 | 10/2008 | |
| GB | 1 024 340 | 3/1966 | |
| GB | 2 144 961 A | 3/1985 | |
| JP | 2008-543588 A | 12/2008 | |
| JP | 2010-173064 A | 8/2010 | |
| LI | EP 1136191 A2 * | 9/2001 | ......... B25D 16/006 |
| WO | 2010/087206 A1 | 8/2010 | |

* cited by examiner

PERCUSSION UNIT

This application is a 35 U.S.C. §371 National Stage Application of PCT/EP2013/058460, filed on Apr. 24, 2013, which claims the benefit of priority to Ser. No. DE 10 2012 208 870.9, filed on May 25, 2012 in Germany, the disclosures of which are incorporated herein by reference in their entirety.

BACKGROUND

There are already known percussion mechanism units, in particular for a rotary and/or percussion hammer, comprising a control unit that is provided to control a pneumatic percussion mechanism by open-loop and/or closed-loop control.

SUMMARY

The disclosure is based on a percussion mechanism unit, in particular for a rotary and/or percussion hammer, comprising a control unit that is provided to control a pneumatic percussion mechanism by open-loop and/or closed-loop control.

It is proposed that the control unit be provided to set at least one operating parameter temporarily to a starting value, in at least one operating state, for the purpose of changing from an idling operating state to a percussive operating state. A "percussion mechanism unit" in this context is to be understood to mean, in particular, a unit provided to operate a percussion mechanism. The percussion mechanism unit may have, in particular, a control unit. The percussion mechanism unit may have a drive unit and/or a transmission unit, provided to drive the percussion mechanism. A "control unit" in this context is to be understood to mean, in particular, a device of the percussion mechanism unit that is provided to control, in particular, the drive unit and/or the percussion mechanism by open-loop and/or closed-loop control. The control unit may preferably be realized as an electrical, in particular an electronic, control unit. A "rotary and/or percussion hammer" in this context is to be understood to mean, in particular, a power tool provided for performing work on a workpiece by means of a rotary or non-rotary working tool, wherein the power tool may apply percussive impulses to the working tool. Preferably, the power tool is realized as a hand power tool that is manually guided by a user. A "percussion mechanism" in this context is to be understood to mean, in particular, a device having at least one component provided to generate a percussive impulse, in particular an axial percussive impulse, and/or to transmit such a percussive impulse to a working tool disposed in a tool holder. Such a component may be, in particular, a striker, a striking pin, a guide element, such as, in particular, a hammer tube and/or a piston, such as, in particular, a pot piston and/or other component considered appropriate by persons skilled in the art. The striker may transmit the percussive impulse directly or, preferably, indirectly to the working tool. Preferably, the striker may transmit the percussive impulse to a striking pin, which transmits the percussive impulse to the working tool. "Provided" is to be understood to mean, in particular, specially designed and/or specially equipped. An "idling operating state" in this context is to be understood to mean, in particular, an operating state of the percussion mechanism that is characterized by absence of regular percussive impulses, or in which only weak percussive impulses occur. "Weak percussive impulses" in this context are to be understood to mean, in particular, percussive impulses having less than 50%, preferably less than 25%, particularly preferably less than 10% of the percussive intensity provided for performing work on a workpiece. Preferably, the percussion mechanism can have an idling mode, in which it is provided for an idling operating state. A "percussive operating state" in this context is to be understood to mean, in particular, an operating state of the percussion mechanism in which preferably regular percussive impulses are exerted by the percussion mechanism, with a percussive intensity provided for performing work on a workpiece. Preferably, the percussion mechanism may have a percussion mode, in which it is provided to operate percussively. "Regular" in this context is to be understood to mean, in particular, recurring, in particular with a provided frequency. An "operating state" in this context is to be understood to mean, in particular, a mode and/or a setting of the control unit. The operating state may be dependent, in particular, on user settings, ambient conditions and other parameters of the percussion mechanism. "Changing" from an idling operating state to a percussive operating state in this context is to be understood to mean a starting of the percussion mechanism from the idling operating state. The change to the percussive operating state may be effected, in particular, when the percussion mechanism is switched over from the idling mode to the percussion mode. An "operating parameter" in this context is to be understood to mean, in particular, a parameter generated and/or influenced by the percussion mechanism unit for the purpose of operating the percussion mechanism, such as a drive rotational speed, an operating pressure or a throttle position. A "starting value" in this context is to be understood to mean, in particular, a stable operating parameter that is suitable for a reliable starting of the percussion mechanism. "Reliable" in this context is to be understood to mean, in particular, that, when the percussion mechanism is switched over from the idling mode to the percussion mode, the percussive operating state ensues in more than 90%, preferably more than 95%, particularly preferably more than 99% of cases. "Temporarily" in this context is to be understood to mean, in particular, a limited time period. In particular, the time period may be shorter than 30 seconds, preferably shorter than 10 seconds, particularly preferably shorter than 5 seconds. Reliable starting of the percussive operating state can be achieved. A percussive operating state is achievable with operating parameters that are unsuitable for a starting of the percussion mechanism. Operating parameters that are unsuitable for a starting of the percussion mechanism may be reliable as a working value. An idling operating state is achievable with operating parameters that are unsuitable for a starting of the percussion mechanism. Operating parameters that are unsuitable for a starting of the percussion mechanism may be reliable as an idling value. Reliability of the percussion mechanism can be increased. A performance capability of the percussion mechanism can be increased.

It is proposed that the control unit be provided to set the operating parameter to an above-critical working value, in at least one operating state, in the percussive operating state. The working value may be defined by the control unit or set by the user, for example via a selector switch. Various working values may be defined, depending on a particular case of working and/or a type of material and/or a tool type. Various possible working operations may be set, to which working values are assigned. The control unit may be provided, in particular, to set an above-critical working value when a user requests a working value that is above-critical under given conditions. An "above-critical" working value in this context is to be understood to mean, in particular, an operating parameter with which a successful transition from the idling operating state to the percussive operating state is not assured. In particular, in the case of a percussion mechanism in the percussion mode, with an above-critical working value the percussive operating state may start in fewer than 50%, preferably in fewer than 80%, particularly preferably in fewer than 95% of cases. A relationship between an operating parameter and a percussion amplitude of a striker, or of another component of the percussion mechanism serving to generate percussion, may have, in particular, a hysteresis. An above-critical operating parameter may be characterized, in particular, in that it is above or below a limiting value, above or below which a function of the amplitude in dependence on the operating parameter is multi-valued. An above-critical working value during an already successful percussive operating state may preferably be distinguished by a stable continuation of the percussive operating state. A reliable starting of the percussion mechanism may preferably be effected with a starting value. Preferably, the starting value lies in a range of the operating parameter in which the function of the amplitude in dependence on the operating parameter has a single-valued solution. With an above-critical operating parameter, a performance of the percussion mechanism can be increased. A performance capability of a power tool equipped with the percussion mechanism can be increased. The percussion mechanism can be operated reliably with an above-critical working value. Preferably, the percussion mechanism, in the idling mode, may be operated in an idling operating state with an idling value that corresponds to the above-critical starting value. Preferably, for the purpose of starting the percussion mechanism, the operating parameter is set temporarily to the starting value. The percussion mechanism may be operated with the above-critical operating parameter in the percussive operating state and in the idling operating state. The percussion mechanism may be operated with the operating parameter, selected by the user, in the idling operating state and in the percussive operating state. The selected operating parameter can be identified particularly easily by the operator, including in the idling operating state.

Further, it is proposed that the control unit be provided to set the operating parameter directly to the working value, in at least one operating state, for the purpose of changing from the idling operating state to the percussive operating state. The control unit may be provided, in particular, to set the operating parameter directly to the working value when a user requests a working value that is a stable operating parameter under given conditions. With this working value, changing from the idling operating state to the percussive operating state can be effected in a reliable manner. Setting of a starting value can be avoided. Brief changing of the operating parameter for the purpose of starting the percussion mechanism, resulting in user irritation, can be avoided. There is no need for the control unit to intervene in the operating parameter.

It is proposed that the operating parameter be a throttle characteristic quantity of a venting unit. A "throttle characteristic quantity" in this context is to be understood to mean, in particular, a setting of the venting unit that alters a flow resistance of the venting unit, in particular a flow cross section. A "venting unit" in this context is to be understood to mean, in particular, a ventilation and/or venting unit of the percussion mechanism device. The venting unit may be provided, in particular, to balance the pressure and/or volume of at least one space in the percussion mechanism device. In particular, the venting unit may be provided for ventilating and/or venting a space, in front of and/or behind the striker in the percussion direction, in a guide tube that guides the striker. Preferably, the operating parameter may be a throttle position of the venting unit of the space disposed in front of the striker in the percussion direction. If a flow cross section is enlarged in the case of this venting unit, venting of the space in front of the striker can be improved. A counter-pressure, against the percussion direction of the striker, can be reduced. A percussion intensity can be increased. If a flow cross section is reduced in the case of this venting unit, venting of the space in front of the striker can be reduced. A counter-pressure, against the percussion direction of the striker, can be increased. A percussion intensity can be reduced. In particular, a return movement of the striker, against the percussion direction, can be assisted by the counter-pressure. Starting-up of the percussion mechanism device can be assisted. The operating parameter can ensure reliable starting-up of the percussion mechanism device. The operating parameter with a reduced flow cross section can be a stable operating parameter. A limiting percussion frequency with which reliable start-up is possible can be increased. The percussion mechanism can be started reliably with an increased percussion frequency. The operating parameter with an enlarged flow cross section can be a critical operating parameter in the case of increased performance capability of the percussion mechanism. It can be suitable as a working value.

In an advantageous design of the disclosure, it is proposed that the operating parameter be a percussion frequency. A "percussion frequency" in this context is to be understood to mean, in particular, an averaged frequency with which the percussion mechanism generates percussion impulses when in a percussive operating state. The percussion frequency may be excited, in particular, by a drive moving at a percussion-mechanism rotational speed. A "percussion-mechanism rotational speed" in this context is to be understood to mean, in particular, a rotational speed of a drive, in particular of an eccentric gear mechanism, that moves a piston of the percussion mechanism. The piston may be provided, in particular, to generate a pressure cushion for applying pressure to the striker. The striker may be moved, in particular, at the percussion frequency by the pressure cushion generated by the piston. There is preferably a direct relationship between the percussion frequency and the percussion-mechanism rotational speed. In particular, the absolute value of the percussion frequency 1/s may be the absolute value of the percussion-mechanism rotational speed revs/s. This is the case if the striker executes one stroke per revolution of the eccentric gear mechanism. In the following, therefore, the terms "frequency" and "rotational speed" are used as equivalents. In the case of designs of a percussion mechanism that are different from this relationship, persons skilled in the art will adapt the following statements accordingly. The percussion-mechanism rotational speed can be set particularly easily by the control unit. The percussion-mechanism rotational speed may be especially suited to a particular case of performing work. The percussion mechanism may have an especially high performance capability in the case of a high percussion-mechanism rotational speed. In the case of a higher percussion-mechanism rotational speed, a drive unit of the percussion mechanism may be operated with a higher rotational speed. A ventilation unit driven by the drive unit may likewise be operated with a higher rotational speed. Cooling of the percussion mechanism and/or of the drive unit by the ventilation unit can be improved. A function of the percussion amplitude of the percussion mechanism may be dependent on the percussion-mechanism rotational speed. In the case of a rotational speed above a limit percussion-mechanism rotational speed, the amplitude-frequency response may have a hysteresis and be multi-valued. A starting of the percussive operating state, in the case of switchover from an idling mode to a percussion mode, and/or restarting of the percussive operating state, in the case of an interruption of the percussive operating state, may be unreliable and/or impossible. A percussion-mechanism rotational speed below the limit percussion-mechanism rotational speed can be used as a starting value and/or working value for a stable percussive operating state. A percussion-mechanism rotational speed above the limit percussion-mechanism rotational speed can be used as a working value for a critical percussive operating state. Above a maximum percussion-mechanism rotational speed, a percussive operating state may be impossible and/or unreliable. "Unreliable" in this context is to be understood to mean, in particular, that the percussive operating state fails repeatedly and/or randomly, in particular at least every 5 minutes, preferably at least every minute.

Further, it is proposed that the control unit be provided to lower the percussion-mechanism rotational speed temporarily to a starting frequency, in at least one operating state, for the purpose of changing from the idling operating state to the percussive operating state. A "starting frequency" in this context is to be understood to mean, in particular, a frequency below the limit frequency that is suitable for reliably changing from an idling operating state to a percussive operating state. In particular, the percussion frequency may be lowered to the starting frequency if the percussion mechanism is switched over from the idling mode to the percussion mode. In particular, the percussion frequency may likewise be lowered to the starting frequency if the percussive operating state fails in the percussion mode. Preferably, an idling rotational speed, in the idling mode, may be identical to a working rotational speed in the case of the percussive operating state. It is possible, preferably, to dispense with the lowering to a starting rotational speed if the working rotational speed is a stable operating parameter of the percussion mechanism.

Further, an operation change sensor is proposed, which is provided to signal a change of an operating mode. In particular, a change from the idling mode to the percussion mode can be signaled to the control unit by the operation change sensor. The operation change sensor may be provided to detect a contact pressure of a tool upon a workpiece. Advantageously, it can be identified when the user commences a working operation. Particularly advantageously, the operation change sensor can detect a switchover of the percussion mechanism, in particular opening and/or closing of idling openings, and of further openings, of the percussion mechanism that are provided for a change of operating mode. The operation change sensor can detect a displacement of an idling and/or control sleeve provided for changing the operating mode of the percussion mechanism. The control unit can identify, advantageously, when a change of operating mode of the percussion mechanism occurs. Advantageously, the control unit can alter the operating parameter, in order to assist and/or enable the change of operating mode. A percussive operating state can be started in a reliable manner.

Further, a percussion sensor unit is proposed, which is provided to signal the percussive operating state. In particular, the percussion sensor unit may signal to the control unit that the percussion mechanism is executing the percussive operating state. Advantageously, a successful starting of the percussion mechanism can be identified. Advantageously, intermittence of the percussive operating state can be identified by the control unit. In particular, it is possible to identify intermittence of the percussive operating state during which the percussion mechanism remains in the percussion mode. The control unit can restart the percussion mechanism.

It is proposed that the percussion sensor unit be provided to identify the percussive operating state by evaluation of at least one drive parameter. A "drive parameter" in this context is to be understood to mean, in particular, an operating parameter of the drive unit of the percussion mechanism, such as, in particular, a rotational speed, an electric current consumption and/or a voltage. The percussion sensor unit can identify the percussive operating state from the electric current consumption of the drive unit. An increasing electric current consumption may indicate the percussive operating state. Preferably, the percussion sensor unit may have a load estimator. A "load estimator" in this context is to be understood to mean, in particular, a control device, known to persons skilled in the art, which is provided to estimate a drive load resulting from the percussive operating state, by evaluating a rotational speed characteristic of the drive unit. In particular, the load estimator can estimate the drive load resulting from the percussive operating state, by evaluating periodic rotational speed fluctuations. Preferably, in the evaluation, the load estimator takes account of known periodic loads, such as a variation of a gear ratio of the eccentric gear mechanism with angle, fluctuations of the supply voltage of an output regulator of the drive unit with time, and loads caused by a mass inertia of the drive unit and by parts of the percussion mechanism that are driven by the drive unit. Preferably, the load estimator can distinguish influences of the percussive operating state upon a rotational speed signal from other influences such as, for example, a load caused by a rotating tool when work is being performed on a workpiece. A percussive operating state can be identified in a reliable manner. The rotational speed signal can be already available for regulating the drive unit. The percussion sensor unit can use the existing rotational speed signal. There is no need for additional sensors. A load estimator can dispense with the calculation of a dynamic model. A computing unit of the load estimator can be particularly inexpensive. The percussion sensor unit can be particularly inexpensive. In a further design of the disclosure, it is proposed that the percussion sensor unit have a load observer. A "load observer" in this context is to be understood to mean, in particular, a control device, known to persons skilled in the art, that is provided to estimate an output driving torque of the drive unit from a rotational speed and an electric current consumption of the drive unit, with the aid of a calculated dynamic model of the drive unit. The load observer can identify, in the characteristic of the estimated driving torque, a load that is characteristic of a percussive operating state. In particular, the load estimator can distinguish influences of the percussive operating state upon the driving torque from other influences such as, for example, a load caused by a rotating tool when work is being performed on a workpiece. A percussive operating state can be identified in a reliable manner. The rotational speed signal and the electric current consumption can be already available for regulating the drive unit. The percussion sensor unit can use the existing rotational speed signal and the electric current consumption. There is no need for additional sensors. The percussion sensor unit can be inexpensive. The percussion sensor unit can take account of dynamic loads of the drive unit in a particularly effective manner. The percussion sensor unit can be particularly inexpensive.

In a further design of the disclosure, it is proposed that the percussion sensor unit have at least one sensor for a mechanical measured quantity, which sensor is provided to detect the percussive operating state. A "mechanical measured quantity" in this context is to be understood to mean, in particular, a measured quantity that represents a motion and/or a force, such as, in particular, a force, an acceleration, a speed, a pressure, a sound pressure or a deformation and/or, in particular, a measured quantity that is other than an electrical quantity. In particular, the percussion sensor unit may have an acceleration sensor. Accelerations caused by the percussive impulses can be measured particularly effectively. Preferably, the acceleration sensor may be disposed close to the origin of the percussion, such as, for example, on a guide tube, a tool holder or a transmission housing. Particularly preferably, the acceleration sensor is provided to measure, in particular, accelerations in the direction of percussion. Reliable detection of the percussive operating state can be achieved. Further, it is proposed that the percussion sensor unit comprise a force sensor, such as a piezoelectric sensor, or a deformation sensor, such as a strain sensor. An influence of a force and/or deformation caused by the percussive impulse can be measured particularly effectively. Preferably, the force sensor or the deformation sensor can be disposed on a component and/or between components in the flow of force of the percussive impulse, such as, for example, in or on a tool, a tool holder, a striking pin, a guide tube and/or a striker. Particularly preferably, the force sensor or the deformation sensor is provided to measure, in particular, forces and/or deformations in the direction of percussion. Reliable detection of the percussive operating state can be achieved. Further, it is proposed that the percussion sensor unit comprise a pressure sensor. Preferably, the pressure sensor can be provided to measure a pressure characteristic in the space between the striker and the piston. The pressure accelerating the striker in the direction of percussion can be measured in a particularly reliable manner by the pressure sensor. A percussive operating state can be identified in a particularly reliable manner. A brief rise in pressure, resulting from a displacement of a control and/or idling sleeve, can be identified as a switchover is effected from the idling mode to the percussion mode. In addition to identifying the percussive operating state, the percussion sensor unit can identify a change of operating mode, from the idling mode to the percussion mode.

Further, it is proposed that the percussion sensor unit have at least one filter unit, which is provided to isolate a signal component out of a sensor signal of the sensor. A "filter" unit in this context is to be understood to mean, in particular, a unit provided to alter the sensor signal in its signal spectrum. The filter unit may be part of the signal processing unit of the sensor unit. The filter unit may be, at least partially, a physical unit constituted by components. Preferably, the filter unit may be constituted, at least partially, by a computing algorithm that is processed by a computing unit of the sensor unit for the purpose of filtering the sensor signal. In particular, the filter unit may be provided to amplify and/or attenuate frequency bands and/or to attenuate unwanted signal components and/or to amplify wanted signal components. "Wanted" signal components in this context are to be understood to mean, in particular, signal components that are suitable for detecting the percussion characteristic quantity, such as signal components caused at least substantially directly or indirectly by the signal impulse. "Unwanted" signal components in this context are to be understood to mean, in particular, signal components that are at least only to a limited extent suitable for detecting the percussion characteristic quantity, such as signal components caused, at least substantially, by vibrations of a drive unit or of a transmission of the hand power tool or by work operations performed at the working tool. "At least substantially" is to be understood to mean, in particular, predominantly, by more than 50%, preferably by more than 75%, particularly preferably by more than 90%. The sensor unit can detect the percussion characteristic quantity in a particularly reliable manner. Disturbances of the sensor signal can be reduced.

Advantageously, the control unit has a learning mode for determining at least one operating parameter. In particular, the control unit may have a learning mode for learning at least one limit parameter that demarcates the range of the stable percussive operating state from the critical percussive operating state. Further, the control unit may be provided to learn a maximum parameter, such as the maximum rotational speed, that may not be exceeded in the case of a percussive operating state. Preferably, the control unit is provided to define an advantageous start parameter and/or an advantageous starting rotational speed, in the learning mode. Advantageously, the control unit can determine the operating parameter. The operating parameter, in particular the start parameter, can be defined in an optimal manner, independently of environmental influences. In particular, a reliable start parameter and/or a limit parameter can be independent of an ambient pressure and/or a temperature. Alteration of the percussion mechanism during its service life can be taken into account. In particular, the operating parameter can be adapted to wear of the percussion mechanism, lubrication of the percussion mechanism and other influences. The learning mode may be effected upon an initial startup, upon each startup, at fixed intervals of time, upon each change from the idling mode to the percussion mode, or as a result of a user setting. The percussion mechanism can have optimum operating parameters in differing ambient conditions and with differing influencing factors. There is no need for the operating parameters to be defined by a manufacturer of the percussion mechanism and/or by the user.

It is proposed that, in the learning mode, the control unit store at least one operating parameter in the case of a successful starting of the percussion mechanism. In the case of changing from the idling mode to the operating mode, the control unit can select a high critical working rotational speed. The control unit can then continue to reduce the rotational speed until the percussive operating state commences. This rotational speed may be stored as a limit rotational speed and/or starting rotational speed. A rotational speed that is reduced by a safety factor, for example 0.5 to 0.8 times the determined limit rotational speed, may be stored as a starting rotational speed by the control unit. Alternatively, a limit rotational speed that is reduced by a fixed value may be stored as a starting rotational speed by the control unit. In the case of an operating parameter that is other than a rotational speed, such as a throttle position, the control unit may determine the limit parameter and operating parameter in a similar manner. In a further method, the control unit may learn the limit rotational speed and/or maximum starting rotational speed by incrementing the starting rotational speed by a fixed step or factor, starting from a known reliable starting rotational speed, upon each starting of the percussion mechanism. If the starting of the percussion mechanism was successful, the rotational speed is stored as a reliable starting rotational speed. If, in the case of changing from the idling mode to the percussion mode, the starting of the percussion mechanism fails for the duration of a fixed timespan, the set rotational speed value is rejected and a preceding, lower rotational speed value is used as a starting rotational speed for future changes of operation. Further, if a maximum allowable vibration is exceeded, and/or if the percussive operating state is discontinued, the control unit can define a maximum rotational speed that is not to be exceeded in future. It is possible for the operating parameters to be determined in a simple, reliable manner.

Further, it is proposed that the control unit have at least one delay parameter, which is provided to influence a time period for a change between two values of the operating parameter. The change from an idling value and/or working value to a starting value and/or from the starting value to the working value may be effected by a setpoint value step-change. Preferably, the change may be effected linearly and/or have a steady characteristic. An electric current consumption of the drive unit can be limited. Accelerations, driving forces and/or vibrations can be reduced. The time period and/or the characteristic of the change between two operating parameters may preferably be defined in dependence on a setting of a selector switch and/or a particular case of performing work and/or a type of material and/or a tool type and/or ambient conditions. In particular, in the case of a hammer drilling operation, a slow change between operating parameters may be appropriate, e.g. the change may take at least 1 to 2 seconds. In the case of chipping, a short time may be appropriate for a change between operating parameters, e.g. 0.1 to 0.5 seconds. Preferably, the time period and/or the characteristic of the change between two operating parameters may be dependent on a working position; in particular, the time period may be shortened if the working position is directed at least substantially downward, and may be lengthened if the working position is directed at least substantially upward. A "working position" in this context is to be understood to mean, in particular, an alignment of the percussion mechanism in relation to gravity. "Upward" in this context is to be understood to mean, in particular, a direction opposite to gravity, "downward" being at least substantially in the direction of gravity. The delay parameter may be provided to define at least one slope and/or at least one curve characteristic of the function defining the change between the operating parameters. Advantageously, the time period for starting-up of the percussion mechanism can be defined. "Starting-up" in this context is to be understood to mean, in particular, a starting of the percussion mode from a standstill state of the drive unit. Starting-up of the percussion mechanism can be effected from standstill directly to a critical working value, in particular a critical working rotational speed. If the rotational speed increases slowly, the percussion mechanism can start before the limit rotational speed is attained. If the rotational speed increases rapidly, a starting of the percussion mechanism may fail before the limit rotational speed is attained. For a starting of the percussion mechanism, the rotational speed must be set temporarily to the starting rotational speed. Preferably, the control unit has a learning mode that is provided to learn a maximum rise rate for a starting of the percussion mechanism with a critical working parameter. The control unit can progressively increase the rise rate of the change from standstill to the working rotational speed in the case of successive changes to the percussive operating state, from standstill. If the starting of the percussion mechanism fails, the maximum rise rate can be exceeded. The control unit can define a reduced rise rate as a maximum rise rate for a starting of the percussion mechanism. It is likewise possible, for a starting of the percussion mechanism from standstill, for the control unit, in the learning mode, to first set a high rise rate and, if a starting of the percussion mechanism is unsuccessful in the case of renewed percussion mechanism starts from standstill, to reduce this rise rate progressively, until a reliable starting of the percussion mechanism is achieved. In the case of an unsuccessful starting of the percussion mechanism, the control unit can start the percussion mechanism by a temporary change to the starting rotational speed. Optimum operation of the percussion mechanism can be ensured. Parameters can be defined automatically.

Further, an operating-condition sensor unit is proposed. An operating-condition sensor unit may be provided, in particular, to measure an air pressure surrounding the percussion mechanism. A temperature sensor of the operating-condition sensor unit may be provided, in particular, to measure an air temperature surrounding the percussion mechanism and/or to measure a temperature of the percussion mechanism, in particular that of a percussion mechanism housing and/or guide tube. There may be further influencing factors available for operation of the percussion mechanism device. A robustness reserve of the operating parameters can be kept small. A "robustness reserve" in this context is to be understood to mean, in particular, a setting of an operating parameter that is provided to ensure reliable operation in the case of deviating operating conditions, which can result in a reduced performance capability under certain operating conditions.

It is proposed that the control unit be provided to process a measured quantity of the operating-condition sensor unit. In particular, the control unit may define the limit parameter and/or the start parameter and/or the maximum parameter in dependence on at least one measurement quantity of the operating-condition sensor unit. The limit parameter and/or start parameter and/or maximum parameter of the percussion mechanism may be dependent on the ambient pressure and/or on the temperature. The limit parameter and/or start parameter and/or maximum parameter may be stored in a memory unit, in dependence on ambient pressure and/or temperature. A computing unit may have available functions for calculating admissible limit parameters and/or start parameters and/or maximum parameters. The control unit may define the parameters on the basis of the measured quantities. The stored parameters and/or the functions for calculation may be selected such that the determined parameters have a safety margin. Controlled operation of the starting of the percussion mechanism and/or controlled setting of the operating parameters can be achieved. "Controlled operation" and/or "controlled setting" in this context is to be understood to mean, in particular, that there is no determination of the successful percussive operating state. There is no need for a percussion sensor. In the case of changing of an operating mode, the control unit can use the parameters defined in dependence of the measured quantities. Savings can be made in respect of components and costs. There is no need for identification of the percussive operating state. Malfunctions resulting from incorrect identification of the percussive operating state can be avoided. It is possible to optimize the operating parameters in dependence on environmental parameters. In particular, a starting of the percussion mechanism can be ensured in the case of high altitudes and/or reduced ambient pressure.

Further, a hand power tool is proposed, in particular a rotary and/or percussion hammer, comprising a percussion mechanism unit according to the disclosure. The hand power tool may have the stated advantages.

Further, there is proposed a control unit, according to the disclosure, of a hand power tool. A hand power tool comprising the control unit may have the stated advantages. An existing hand power tool may be retrofitted with the control unit according to the disclosure. The properties of the control unit according to the disclosure may be imparted to an existing control unit by an adapted operating software.

Further, there is proposed a method for operating a pneumatic percussion mechanism comprising a percussion mechanism unit having the features described. The percussion mechanism, when operated according to the proposed method, may have the stated advantages.

BRIEF DESCRIPTION OF THE DRAWING

Further advantages are given by the following description of the drawings. The drawings show four exemplary embodiments of the disclosure. The drawings, the description and the claims contain numerous features in combination. Persons skilled in the art will also expediently consider the features individually and combine them to create appropriate further combinations.

There are shown in the drawings.

DETAILED DESCRIPTION

Figure 1:
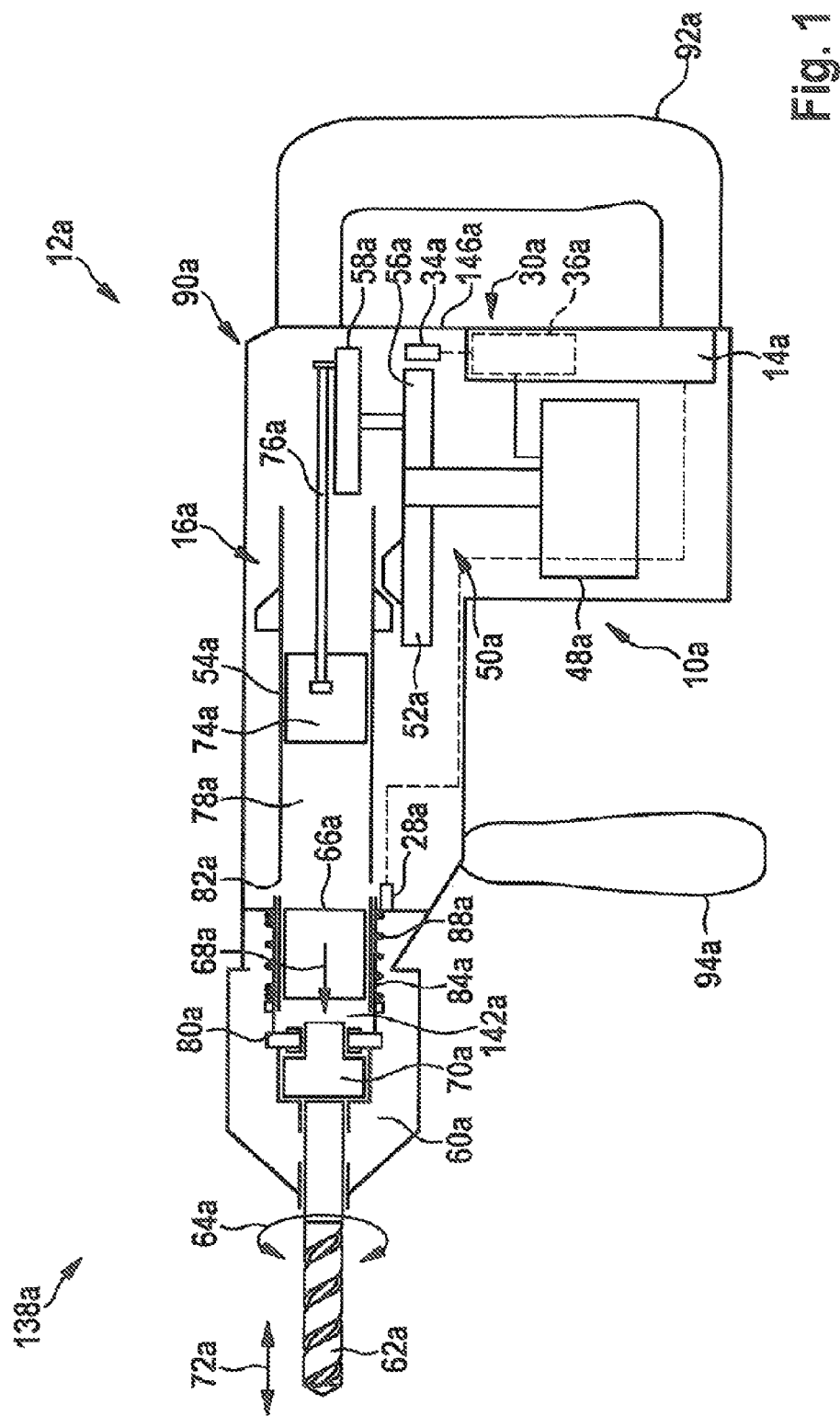
FIG. 1 a schematic representation of a rotary and percussion hammer having a percussion mechanism unit according to the disclosure, in a first exemplary embodiment, in an idling mode, FIG. 2 a schematic representation of the rotary and percussion hammer in a percussion mode, FIG. 3 a schematic representation of a simulated amplitude-frequency response of a non-linear oscillatory system, FIG. 4 a schematic representation of a further simulated amplitude-frequency response of the non-linear oscillatory system, FIG. 5 a schematic representation of the simulated percussion energy of the percussion mechanism unit in the case of a starting of the percussion mechanism with a falling and with a rising percussion frequency, FIG. 6 a schematic representation of the simulated percussion energy of the percussion mechanism unit in the case of a starting of the percussion mechanism with differing ambient pressure conditions, FIG. 7 a schematic representation of a possible definition of a starting value, a limit value, a working value and a maximum value, FIG. 8 a schematic representation of a filter unit of a percussion sensor unit, for isolation of a signal component, FIG. 9 a representation of a block diagram of the percussion mechanism unit, FIG. 10 a representation of a sequence diagram of the control unit of the percussion mechanism unit in the case of a change between an idling mode and a percussion mode, FIG. 11 a representation of signals of the percussion mechanism unit in the case of a change between the idling mode and the percussion mode, FIG. 12 a representation of possible setpoint characteristics of the percussion frequency in the case of the change from an idling value to the starting value, FIG. 13 a representation of possible setpoint characteristics of the percussion frequency in the case of the change from the starting value to the working value, FIG. 14 a schematic representation of a rotary and percussion hammer having a percussion mechanism unit according to the disclosure that comprises an operating-condition sensor unit, in a second exemplary embodiment, FIG. 15 a schematic representation of a family of characteristics for the determination of at least one operating parameter, FIG. 16 a schematic representation of a venting unit of a percussion mechanism of a rotary and percussion hammer having a percussion mechanism unit, in a third exemplary embodiment, FIG. 17 a further schematic representation of the venting unit, and FIG. 18 a schematic representation of a rotary and percussion hammer having a percussion mechanism unit that comprises a percussion sensor unit, in a further exemplary embodiment.
Figure 2:
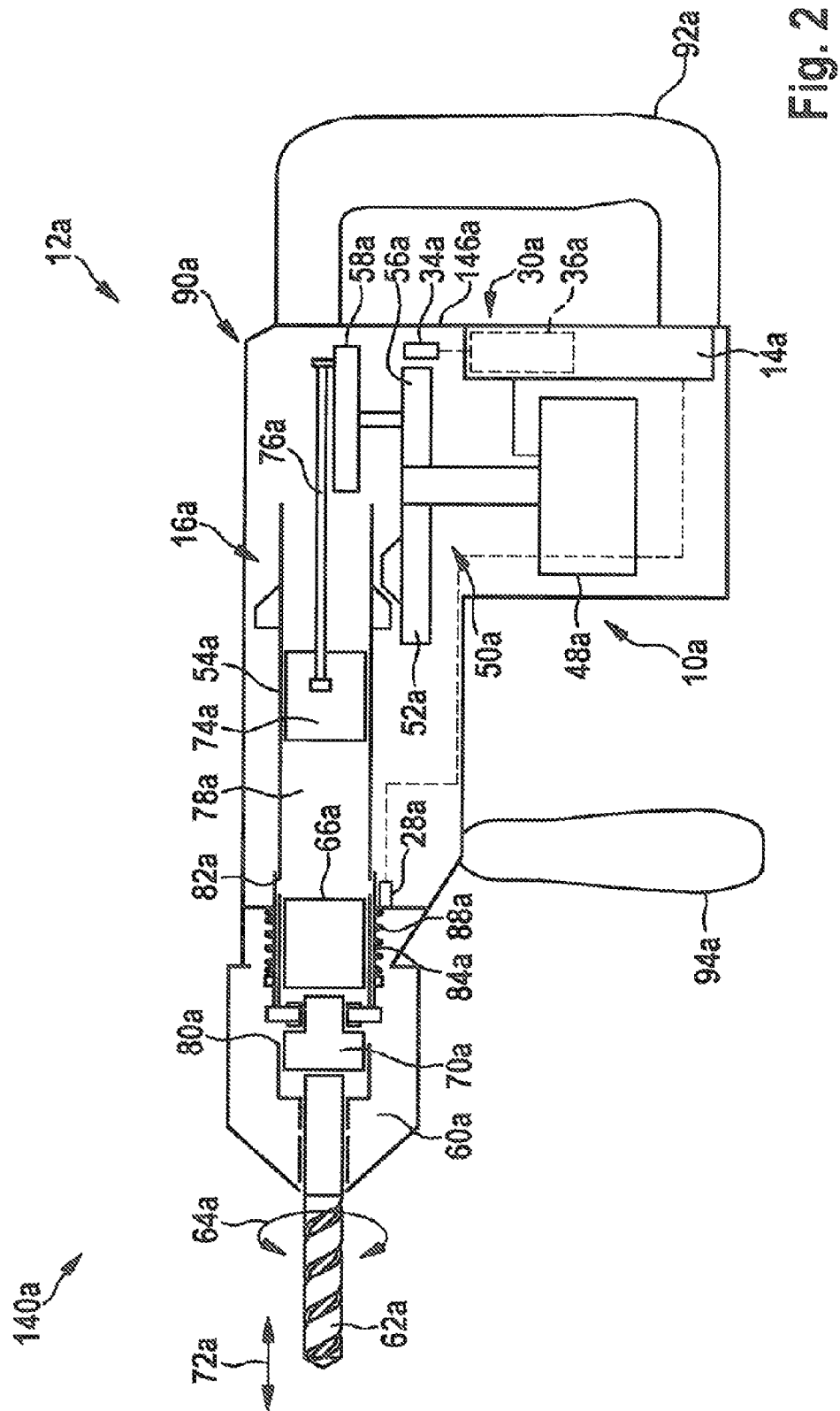
Figure 7:
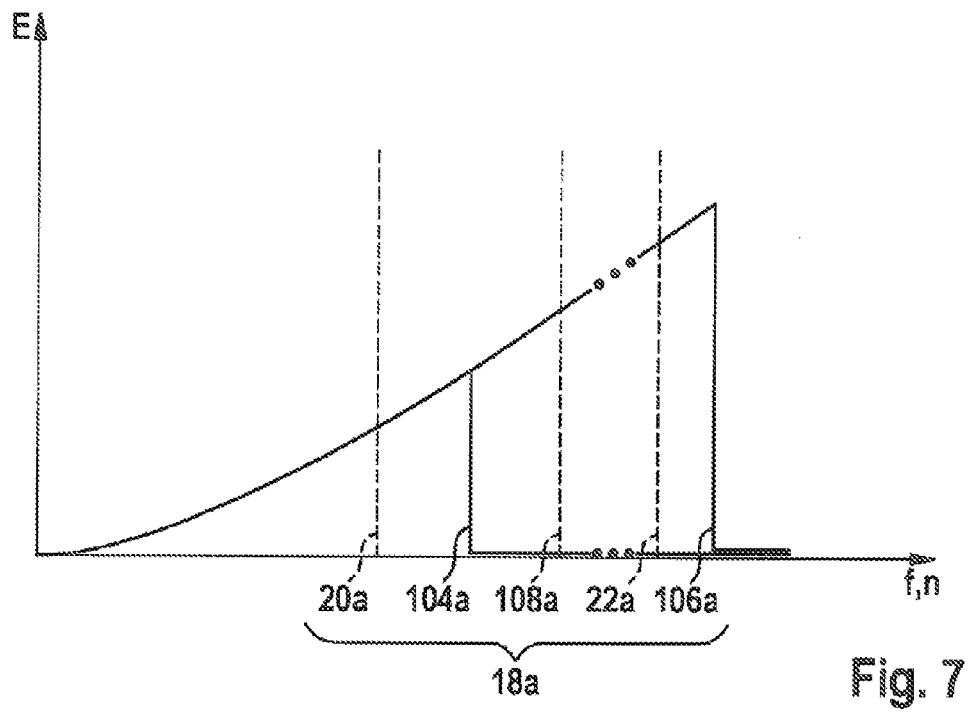

FIG. 1 and FIG. 2 show a rotary and percussion hammer 12a, having a percussion mechanism unit 10a, and having a control unit 14a, which is provided to control a pneumatic percussion mechanism 16a by open-loop and closed-loop control. The percussion mechanism unit 10a comprises a motor 48a, having a transmission unit 50a that drives a hammer tube 54a in rotation via a first gear wheel 52a and drives an eccentric gear mechanism 58a via a second gear wheel 56a. The hammer tube 54a is connected in a rotationally fixed manner to a tool holder 60a, in which a tool 62a can be clamped. For a drilling operation, the tool holder 60a and the tool 62a can be driven with a rotary working motion 64a, via the hammer tube 54a. If, in a percussive operating state, a striker 66a is accelerated in a percussion direction 68a, in the direction of the tool holder 60a, upon impacting upon a striking pin 70a that is disposed between the striker 66a and the tool 62a it exerts a percussive impulse that is transmitted from the striking pin 70a to the tool 62a. As a result of the percussive impulse, the tool 62a exerts a percussive working motion 72a. A piston 74a is likewise movably mounted in the hammer tube 54a, on the side of the striker 66a that faces away from the percussion direction 68a. Via a connecting rod 76a, the piston 74a is moved periodically in the percussion direction 68a and back again in the hammer tube 54a, by the eccentric gear mechanism 58a driven with a percussion-mechanism rotational speed. The piston 74a compresses an air cushion 78a enclosed, between the piston 74a and the striker 66a, in the hammer tube 54a. Upon a movement of the piston 74a in the percussion direction 68a, the striker 66a is accelerated in the percussion direction 68a. A percussive operating state can commence in dependence on operating parameters 18a described in the following (FIG. 7). The striker 66a, likewise in dependence on operating parameters 18a such as percussion frequency, temperature and ambient pressure, can be moved back again, contrary to the percussion direction 68a, by a rebound on the striking pin 70a and/or by a negative pressure that is produced between the piston 74a and the striker 66a as a result of the backward movement of the piston 74a, contrary to the percussion direction 68a, and/or by a counter-pressure in the space between the striker 66a and the striking pin 70a, and can then be accelerated for a subsequent percussion impulse back in the percussion direction 68a. Venting openings 80a are disposed in the hammer tube 54a, in a region between the striker 66a and the striking pin 70a, such that the air enclosed between the striker 66a and the striking pin 70a in a striking space 142a can escape. Idling openings 82a are disposed in the hammer tube 54a, in a region between the striker 66a and the piston 74a. The tool holder 60a is mounted so as to be displaceable in the percussion direction 68a, and is supported on a control sleeve 84a. A spring element 88a exerts a force upon the control sleeve 84a, in the percussion direction 68a. In a percussion mode 140a (FIG. 2), in which the tool 62a is pressed against a workpiece by a user, the tool holder 60a displaces the control sleeve 84a against the force of the spring element 88a such that it covers the idling openings 82a. If the tool 62a is taken off the workpiece, the tool holder 60a and the control sleeve 84a are displaced by the spring element 88a in the percussion direction 68a, into an idling mode 138a (FIG. 1), such that the control sleeve 84a releases the idling openings 82a. A pressure in the air cushion 78a between the piston 74a and the striker 66a can escape through the idling openings 82a. In the idling mode 138a, the striker 66a is not accelerated, or is accelerated only slightly, by the air cushion 78a. In the idling operating state, the striker 66a does not exert any percussion impulses, or exerts only slight percussion impulses, upon the striking pin 70a. The rotary and percussion hammer 12a has a hand power-tool housing 90a, having a handle 92a and an ancillary handle 94a, by which it is guided by a user.

Starting of a percussive operating state upon switching over the percussion mechanism unit 10a from the idling mode 138a to the percussion mode 140a by closing the idling openings 82a is dependent on the operating parameters 18a. Owing to the air cushion 78a enclosed between the piston 74a and the striker 66a, the piston 74a is subjected to a periodic excitation, at a percussion frequency that corresponds to the percussion-mechanism rotational frequency of the eccentric gear mechanism 58a.

Figure 3:
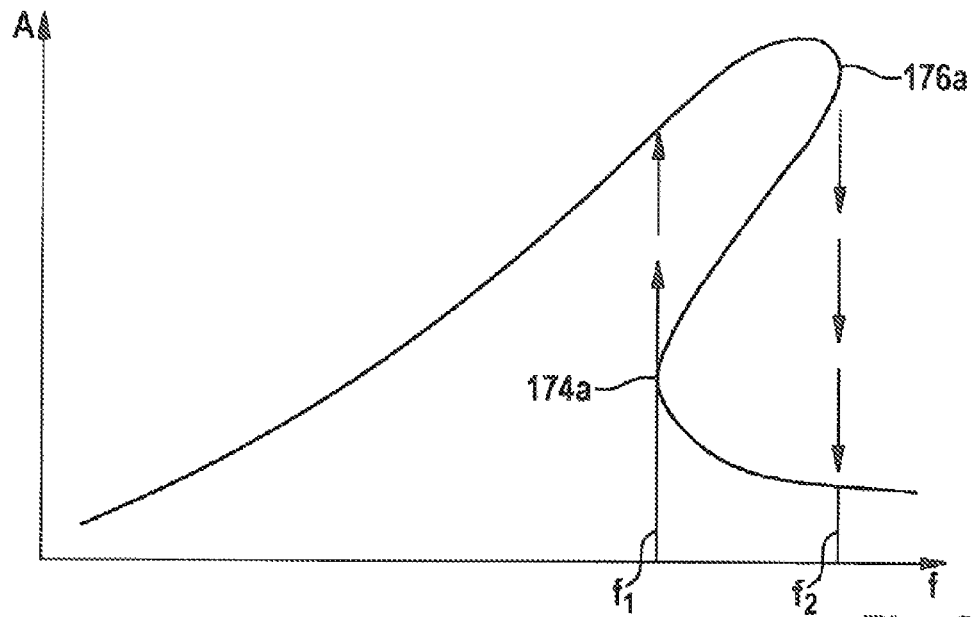
Figure 4:
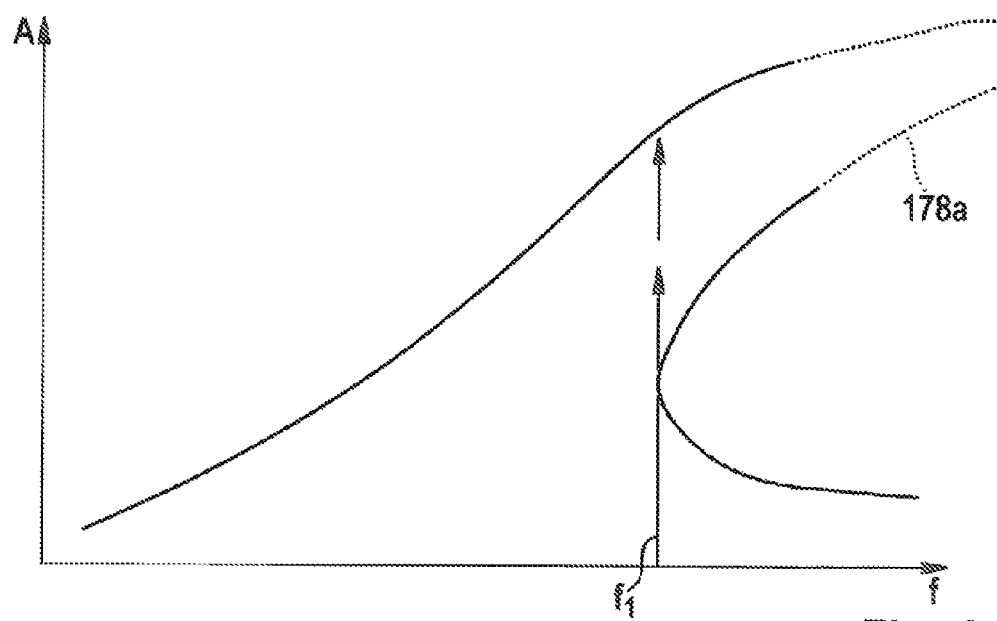

The percussion mechanism 16a constitutes a non-linear oscillatory system. To aid comprehension, FIG. 3 shows a schematic representation of a simulated amplitude response of a general, non-linear oscillatory system, as a function of a frequency f. The amplitude A in this case corresponds to the amplitude of an oscillating body of the system, corresponding to the striker 66a and not represented in greater detail here, in the case of an external excitation, as effected by the piston 74a in the case of the percussion mechanism 16a. The amplitude-frequency response is non-linear, the amplitude-frequency response having a plurality of solutions at high frequencies. Which amplitude ensues in this range depends, inter alia, on the direction in which the frequency f is varied. If, starting from a higher frequency f, the frequency goes below a minimum frequency $f_1$ of the range of the amplitude-frequency response having a plurality of solutions, the amplitude A jumps from a vertex 174a with an infinite slope to an admissible solution of the amplitude-frequency response having a higher level. If a maximum frequency $f_2$ of the range of the amplitude-frequency response having a plurality of solutions is exceeded from a lower frequency f, the amplitude A jumps from a vertex 176a with an infinite slope to an admissible solution of the amplitude-frequency response having a lower level. In FIG. 3, this behavior is indicated by arrows. FIG. 4 shows a further simulated amplitude-frequency response of the non-linear oscillator system in the case of different conditions. Instead of having a maximum frequency $f_2$, the amplitude-frequency response has a gap 178a. This case occurs, for example, if the maximum frequency $f_2$ is higher than a possible excitation frequency with which the oscillatory system can be excited. In the case of the percussion mechanism 16a, the excitation frequency can be limited, for example, by a maximum rotational speed of the eccentric gear mechanism 58a.

Figure 5:
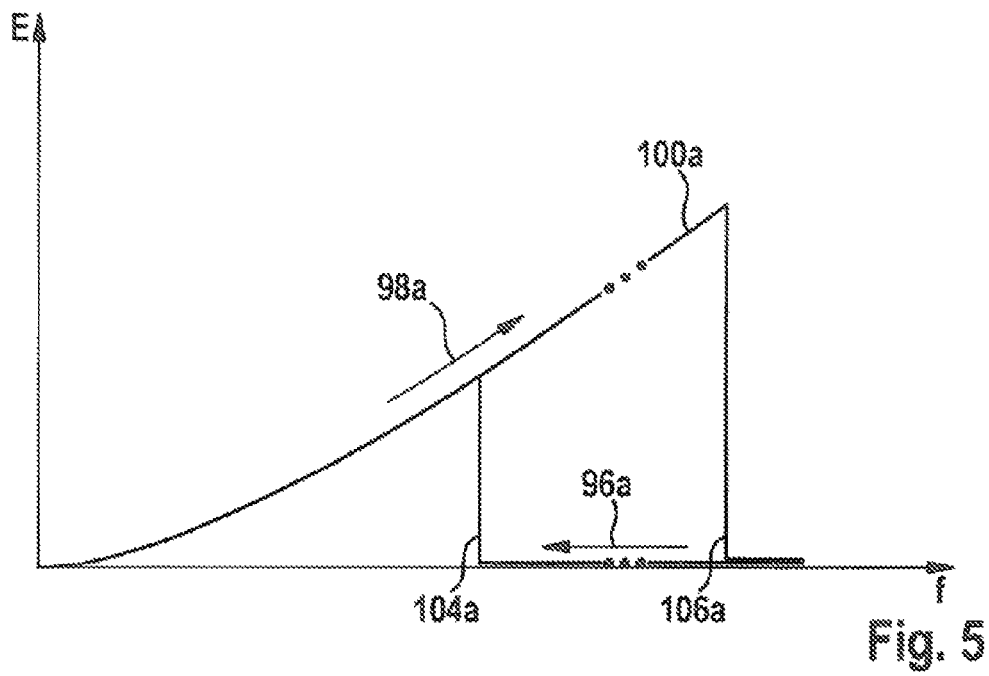

FIG. 5 shows the effect of the non-linear amplitude-frequency response upon the percussive operating state of the percussion mechanism 16a. FIG. 5 shows a simulated percussion energy E of the percussion mechanism 16a in the case of a starting of the percussion mechanism with a falling percussion frequency 96a, and with a rising percussion frequency 98a. If the striker 66a is excited with a rising percussion-mechanism rotational speed, or percussion frequency 98a, the percussion energy E rises with the rise in the percussion frequency 98a. If the striker 66a is excited with a falling percussion-mechanism rotational speed, or percussion frequency 96a, starting from an idling operating state, from a high percussion-mechanism rotational speed, the percussive operating state commences only at a certain percussion-mechanism rotational speed. This percussion-mechanism rotational speed constitutes a limit value 104a. Above this percussion frequency, in the case of a falling percussion frequency 96a the striker 66a does not begin to move, or begins to move only with a low amplitude and/or speed, even if the idling openings 82a are closed in the case of a switchover from the idling mode 138a to the percussion mode 140a. No percussive impulses, or only very slight percussive impulses, are exerted upon the striking pin 70a by the striker 66a. Above a maximum value 106a, the percussion energy E drops sharply. In this case, the striker 66a does not execute any movement in the percussion direction 68a, or executes movements of small amplitude in the percussion direction 68a, such that no percussive impulses, or only slight percussive impulses having a low percussion energy E, are delivered to the striking pin 70a. Depending on ambient conditions and the design of the percussion mechanism 16a, the limit value 104a lies in a range of from 20-70 Hz. The maximum value 106a is greater than the limit value 104a and, depending on ambient conditions and the design of the percussion mechanism 16a, lies in a range of from 40-400Hz. Depending on ambient conditions and the design of the percussion mechanism 16a, the percussion energy E reaches 1-200 joules at the limit value 104a, and 2-400joules at the maximum value 106a.

Figure 6:
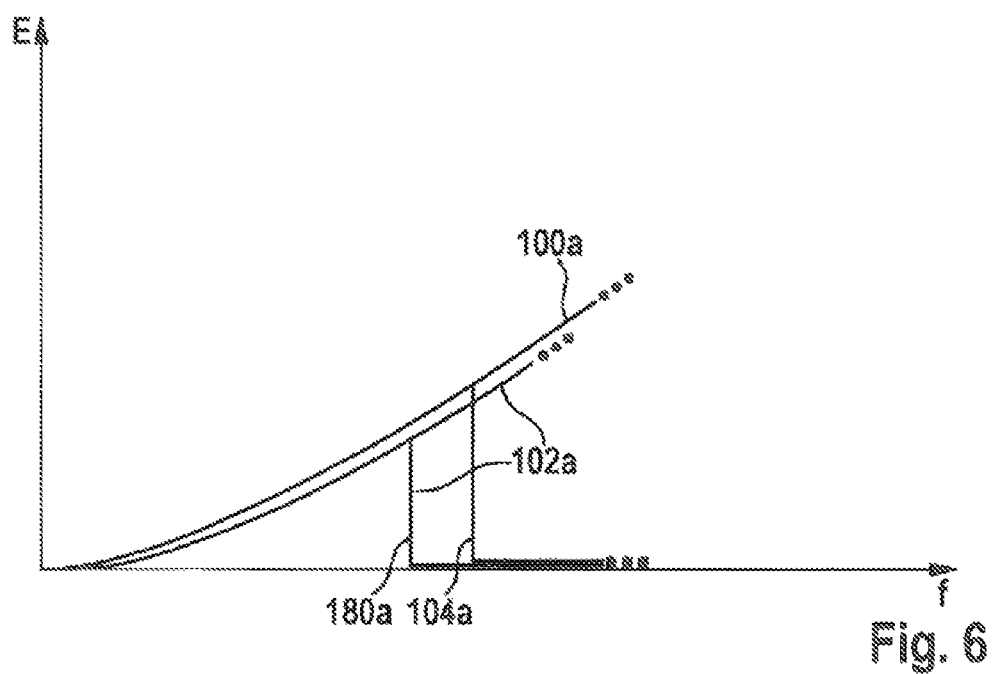

FIG. 6 shows the simulated percussion energies E of the percussion mechanism 16a in the case of a starting of the percussion mechanism with a falling and a rising percussion frequency, in differing ambient conditions, the curve 100a in this example showing the percussion energy E in the case of a first ambient pressure, and the curve 102a showing the percussion energy E in the case of a second ambient pressure that is lower than the first ambient pressure. A limit value 180a of the percussion frequency in the case of the second ambient pressure occurs at a lesser percussion frequency than the limit value 104a of the percussion frequency in the case of the first ambient pressure. If the second ambient pressure is 10% lower than the first ambient pressure, the limit value 180a of the percussion frequency is 1-25% lower than in the case of the first ambient pressure, depending on other influencing factors. A temperature of the percussion mechanism 16a, in particular of the hammer tube 54a, likewise affects the limit value 104a of the percussion frequency. At a lower ambient temperature, there is an increased friction of the striker 66a in the hammer tube 54a, in particular as a result of an increasing viscosity of lubricants. If the temperature of the hammer tube 54a falls by 10K, the limit value 104a of the percussion frequency is reduced by 1-30%, depending on other influencing factors. The limit value 104a of the percussion frequency may also vary by +/−20% because of influences caused by the tool 62a. The tool 62a may affect a rebound of the striker 66a from the striking pin 70a, and thus influence the limit value 104a of the percussion frequency.

FIG. 7 shows a schematic representation of a possible definition of operating parameters 18a of a closed-loop control strategy according to the disclosure, in particular definition of a starting value 20a, the limit value 104a, a working value 22a, and the maximum value 106a. The starting value 20a is preferably selected at a percussion-mechanism rotational speed n and/or percussion frequency f at which the amplitude-frequency response has a single-valued solution. The starting value 20a is less than or equal to the limit value 104a. A reliable starting of the percussion mechanism can be ensured, irrespective of the direction from which the starting value 20a is approached. The limit value 104a represents the transition to a multi-valued amplitude-frequency response and the maximum starting value 20a. The starting value 20a is preferably selected at an interval from the limit value 104a, for example with a 10% lower percussion-mechanism rotational speed. Once the percussive operating state has been assured, the percussion mechanism 16a can be operated with a higher output in the case of an above-critical working value 22a. In this case, an above-critical working value 22a is distinguished by a multi-valued amplitude-frequency response. A reliable starting of the percussion mechanism is not guaranteed in the case of the above-critical working value 22a. Above the maximum value 106a, the percussion energy drops sharply. The working value 22a is therefore selected so as to be lower than the maximum value 106a. The working value 22a may be defined by the control unit 14a or may be set by the user, for example via a selector switch, not represented in greater detail here. The working values 22a are defined in dependence on, inter alia, a particular case of performing work and/or a type of material and/or a tool type. Working values 22a are assigned to various settable work operations. A working value 22a above the limit value 104a is an above-critical working value 22a; a working value 22a below the limit value 104a and/or below the starting value 20a is a stable working value 22a. Besides the starting value 20a and the limit value 104a, an idling value 108a may optionally be defined. The idling value 108a is set, in particular, in the idling mode 138a. Advantageously, the idling value 108a is set so as to be higher than the starting value 20a. A ventilation unit, driven by the motor 48a and not represented here, can be operated with a higher rotational speed than in the case of operation with the starting value 20a. The cooling of the percussion mechanism 16a in the idling mode 138a is improved. The user perceives the operating noise of the rotary and percussion hammer 12a to be louder than in the case of the starting value 20a. Further, advantageously, the idling value 108a is set so as to be lower than the working value 22a. Sound emissions and/or vibrations can be reduced in comparison with operation with the working value 22a. Upon changing from the idling mode 138a to the percussion mode 140a, the starting value 20a can be attained more rapidly than from the working value 22a.

The control unit 14a is provided to set the operating parameter 18a temporarily to the starting value 20a, in an operating state in which an above-critical working value 22a has been set, for the purpose of changing from the idling operating state to the percussive operating state. In a percussive operating state in the percussion mode 140a, the control unit 14a then sets the operating parameter 18a to the above-critical working value 22a. The user can reliably start the percussion mechanism unit 10a with an above-critical working value 22a. The idling value 108a is set in the idling mode 138a. The idling value 108a may be identical to the working value 22a, and advantageously is less than the working value 22a and greater than the starting value 20a.

In an operating state in which a stable working value 22a has been selected, at least below the limit value 104a or below the starting value 20a, the control unit 14a sets the operating parameter 18a directly to the working value 22a. Once the idling value 108a, corresponding to the working value 22a, has been set in an idling operating state, there is no need for setting of the operating parameter 18a in the case of a change between idling operation and percussive operation. In the cases described here, the operating parameter 18a is a percussion frequency and/or percussion-mechanism rotational speed. In the case of changing from the idling operating state to the percussive operating state, the control unit 14 temporarily lowers the percussion frequency and/or the percussion-mechanism rotational speed to a starting value 20a if the working value 22a of the percussion-mechanism rotational speed has been selected so as to be higher than the starting value 20a. The starting value 20a and the starting frequency are then equivalent if the percussion frequency is set as an operating parameter 18a.

An operation change sensor 28a is provided to signal a change of an operating mode. The operation change sensor 28a senses a position of the control sleeve 84a. In order to change between the idling mode 138a and the percussion mode 140a, the user presses the tool 62a against a workpiece, such that the control sleeve 84a is displaced contrary to the percussion direction 68a and closes the idling openings 82a. The operation change sensor 28a simultaneously signals to the control unit 14a that a change of operation has occurred, and that the percussion mechanism 16a is now in the percussion mode 140a. The operation change sensor 28a is realized as an inductive sensor, and identifies when the control sleeve 84a is in a position in which it covers the idling openings 82a and the percussion mechanism 16a is in the percussion mode 140a. Alternatively, the operation change sensor 28a may also be mounted in such a way that it identifies when the control sleeve 84a is in a position in which it releases the idling openings 82a and the percussion mechanism 16a is in the idling mode 138a.

Figure 8:
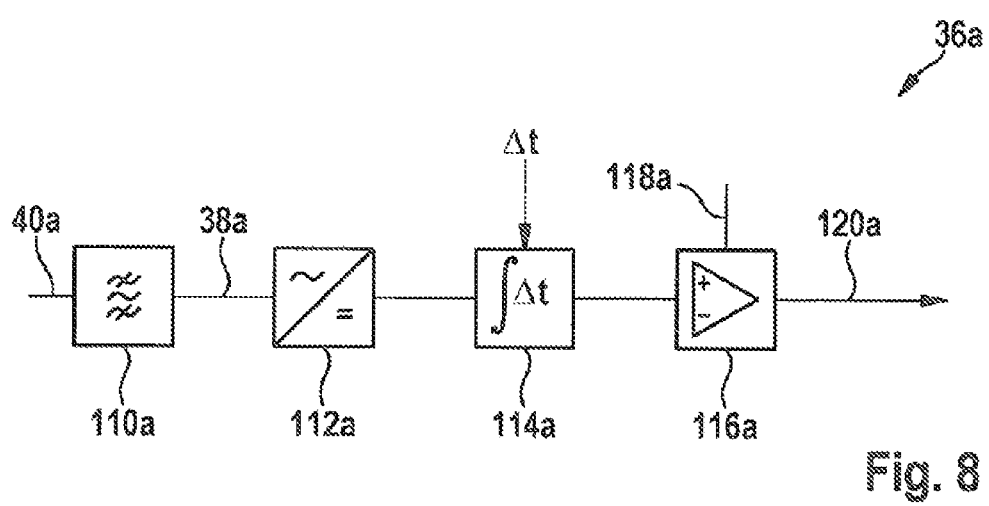

A percussion sensor unit 30a is provided to signal the percussive operating state. By means of the percussion sensor unit 30a, the control unit 14a can identify whether the percussion mechanism 16a is in the percussive operating state or the idling operating state, in particular whether, and at what instant, a starting of the percussion mechanism has commenced. The percussion sensor unit 30a has a sensor 34a for a mechanical measured quantity, the sensor being provided to detect the percussive operating state. The sensor 34a is realized as an acceleration sensor, and measures accelerations 190a on the transmission housing 146a. A filter unit 36a of the percussion sensor unit 30a is provided to isolate a signal component 38a out of the sensor signal 40a of the sensor 34a, for the purpose of preprocessing a sensor signal 40a (FIG. 8). The signal components 38a are excited, in particular, by the percussive impulses. The signal components 38a typically have frequencies in a frequency range of from 1-5 kHz. The filter unit 36a has a bandpass filter 110a, which filters out frequencies outside of the range of 1-5 kHz of the frequencies produced by the percussive impulses. The sensor signal 40a is rectified by a rectifier 112a, and integrated by an integrator 114a during a time window Δt. The time window Δt is matched to the percussion-mechanism rotational speed and the duration of a percussion event. A comparator 116a compares the filtered, rectified and integrated sensor signal 40a with a comparison signal 118a, and forwards the result of the comparison to the control unit 14a, via a digital output 120a, and thus signals the percussive or idling operation.

Figure 9:
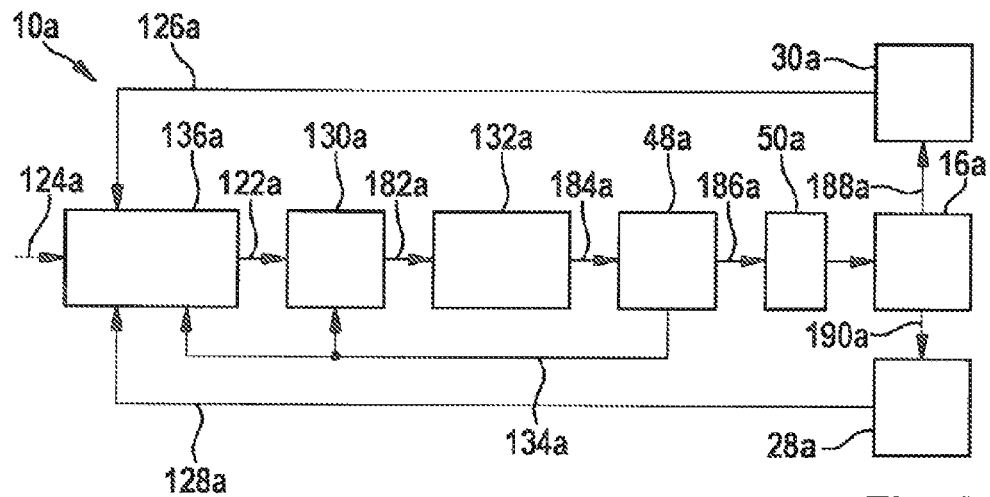

FIG. 9 shows a block diagram of the percussion mechanism unit 10a. A setpoint rotational speed 122a is defined by a setpoint percussion-rate calculator 136a in dependence on a work-operation selection 124a, an operating mode signal 126a of the percussion sensor unit 30a and an operation type signal 128a of the operation change sensor 28a. The setpoint percussion-rate calculator 136a is part of the control unit 14a. Depending on these parameters and on the transmission ratio of the transmission unit 50a, the setpoint rotational speed 122a of the motor 48a is set such that the percussion frequency and/or a rotational speed of the eccentric gear mechanism 58a corresponds to the working value 22a, the idling value 108a or the starting value 20a. The setpoint rotational speed 122a is forwarded to a feedback controller 130a. An actual rotational speed 134a of the motor 48a is fed back, as a controlled variable, to the percussion-rate calculator 136a and the feedback controller 130a. From a difference between the actual rotational speed 134a and the setpoint rotational speed 122a, the feedback controller 130a calculates a phase angle 182a, as a correcting variable for a voltage feedback controller 132a. The voltage feedback controller 132a forwards a voltage 184a to the motor 48a, which, in dependence on the voltage 184a and the actual rotational speed 134a, generates a drive torque 186a and, by means of the latter, drives the percussion mechanism 16a, via the transmission unit 50a. On the basis of the acceleration 190a caused by the percussion mechanism 16a, the percussion sensor unit 30a identifies the type of operation and forwards the operation type signal 128a to the percussion-rate calculator 136a; on the basis of a control sleeve position 188a, the operation change sensor 28a identifies the operating mode, and forwards the operating mode signal 126a to the percussion-rate calculator 136a.

Figure 10:
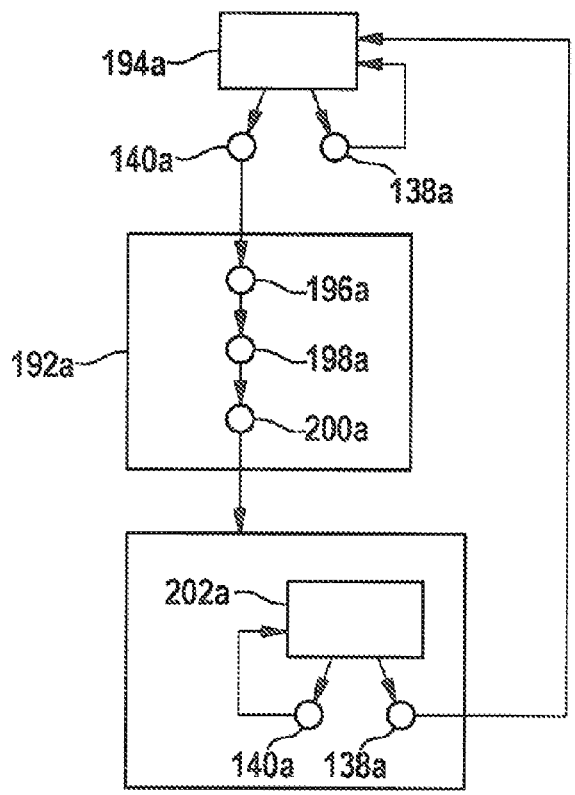

FIG. 10 shows a sequence diagram of the operation of the percussion mechanism unit 10a. In a first step 194a, the operating mode signal 126a is evaluated. This evaluation is repeated continuously, for as long as the idling mode 138a is identified. If the percussion mode 140a is identified, an operation type change 192a is initiated. The starting value 20a is set in a step 196a. In a step 198a, there is a wait until the percussive operating state commences. For this purpose, the operation type signal 128a is evaluated. In a further step 200a, the working value 22a is set. The percussion mechanism 16a is then in the percussive operating state. In a step 202a, the operating mode signal 126a is then evaluated again. This evaluation is repeated continuously, for as long as the percussion mode 140a is identified. If the idling mode 138a is identified, there is a jump to step 194a. If an idling value 108a other than the working value 22a has been defined, this is set upon the jump to step 194a. In an extension of the sequence shown in FIG. 10, the operation type signal 128 can be monitored, in addition to the operating mode signal 126a, in the step 202a. If the operation type signal 128a signals an absence of the percussive operating state while the operating mode signal 126a continues to signal the percussion mode 140a, there is a jump to step 196a. The percussion mechanism 10a can thus be restarted.

The control unit 14a has a learning mode for determining at least the operating parameter 18a. The learning mode can be activated manually, for example if the percussion mechanism 16a is used in altered ambient conditions, such as in the case of an altered ambient pressure. The control unit 14a can execute the learning mode, for example even upon each startup, or at defined intervals of time. For the purpose of learning the starting value 20a, the percussion-mechanism rotational speed is lowered continuously from a defined maximum value 106a, until the percussion sensor unit 30a signals a starting of the percussion mechanism.

The control unit 14a stores the percussion-mechanism rotational speed at the percussion-mechanism rotational speed, multiplied by a safety factor of, for example, 0.8, as a starting value 20a. In an alternative learning mode, the control unit 14a may determine an optimum starting value 20a, in which the percussion-mechanism rotational speed is increased progressively in a repeated change from the idling mode 138a to the percussion mode 140a. Upon a successful starting of the percussion mechanism, the percussion-mechanism rotational speed is stored as a new starting value 20a. If, following a further increase in the percussion-mechanism rotational speed, the starting of the percussion mechanism fails in the change from the idling mode 138a to the percussion mode 140a, the starting value 20a for further changes from the idling mode 138a to the percussion mode 140a is set to the last successful starting value 20a.

Figure 11:
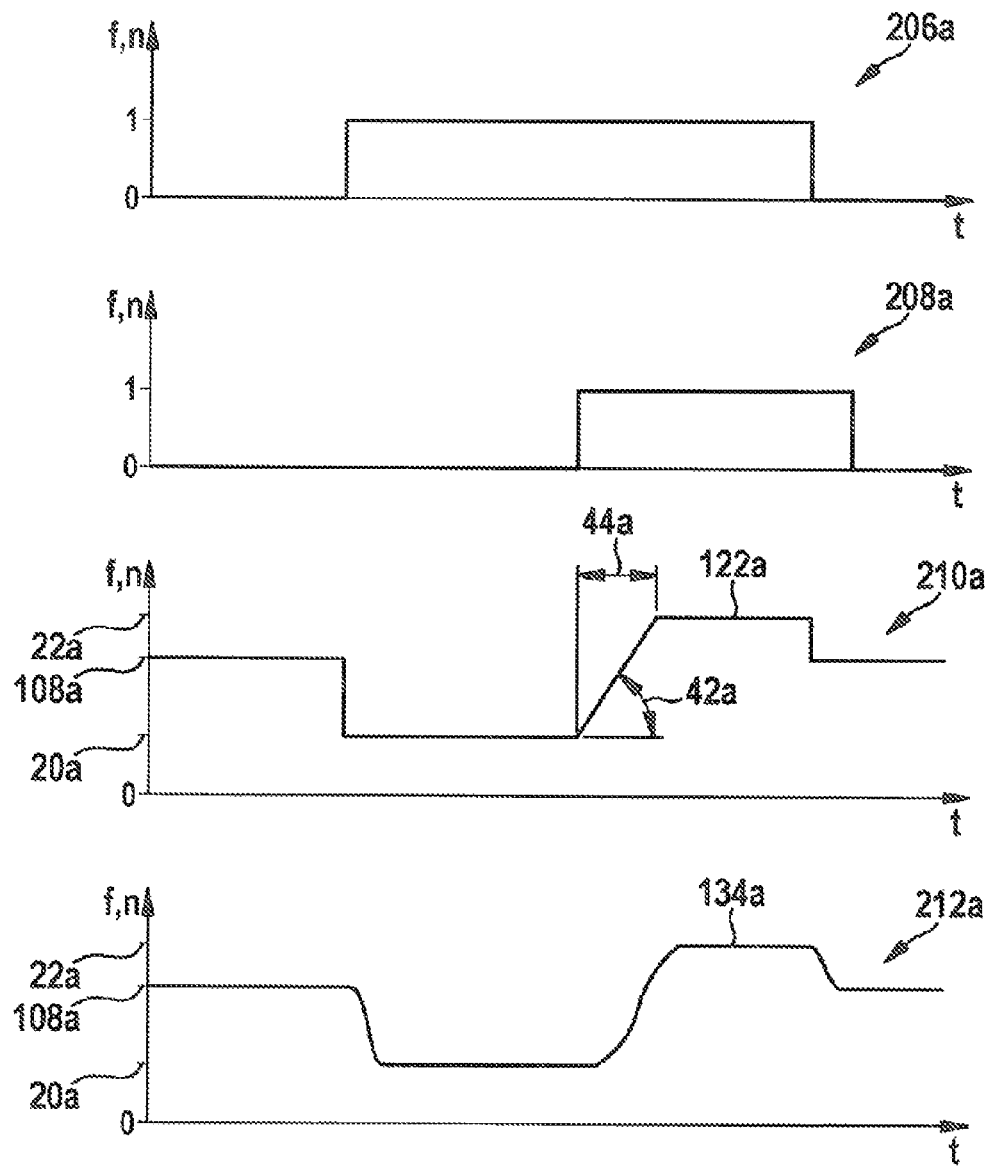

FIG. 11 shows a signal characteristic of an operation of the percussion mechanism unit 10a. The diagram 206a represents a signal characteristic of the operation change sensor 28a, the diagram 208a represents a signal characteristic of the percussion sensor unit 30a, and the diagram 210a represents the characteristic of the setpoint rotational speed 122a during the time t. The setpoint rotational speed 122a may assume, in particular, the idling value 108a, the starting value 20a and the working value 22a. The diagram 212a shows the actual rotational speed 134a. The actual rotational speed 134a follows the setpoint rotational speed 122a, at least to a large extent, with a delay caused by an inertia, particularly of the motor 48a and of the transmission unit 50a. The change between differing setpoint rotational speeds 122a occurs during a time period 44a. The time period 44a characterizes in general the time period of a change between two setpoint rotational speeds 122a. The time period 44a is determined by a delay parameter 42a, which determines the maximum slope of the setpoint rotational speed characteristic. The delay parameter 42a determines how rapidly the setpoint rotational speed 122a changes to the working value 22a in the case of a percussion mechanism identified by the percussion sensor unit 30a, and in the example is the angle of the slope of the setpoint rotational speed 122a during the time period 44a. The delay parameter 42a can likewise be learned, for example in that the time period 44a is extended if the change from the idling operating state to the percussive operating state was unsuccessful because changing to the working value 22a was effected too rapidly.

Figure 12:
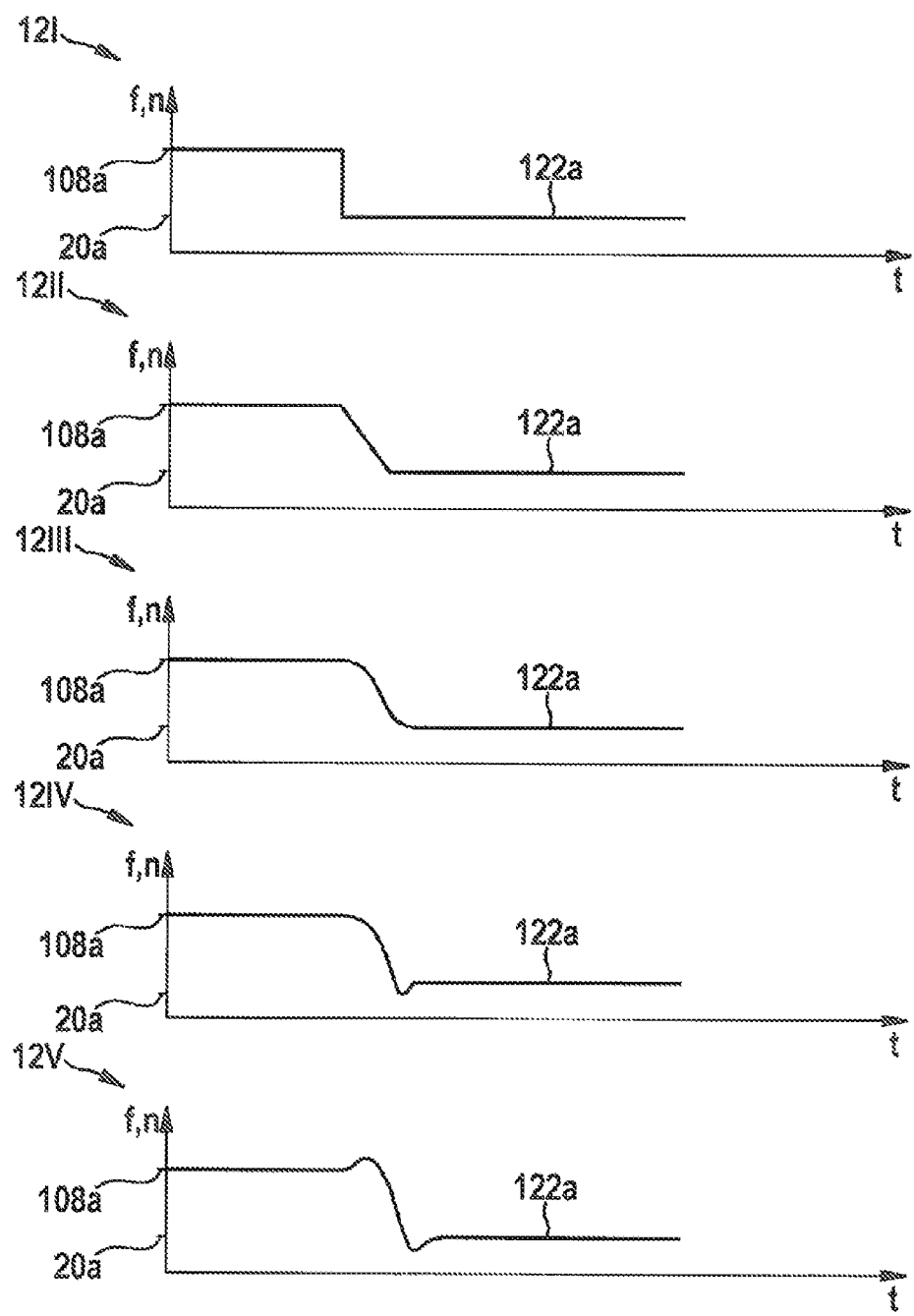

The transition of the setpoint rotational speed 122a from the idling value 108a to the starting value 20a may have differing characteristics, depending on a type of operation. These characteristics are represented in FIG. 12, in the diagrams 12i-12v. The diagram 12i shows a direct jump of the setpoint rotational speed 122a from the idling value 108a to the starting value 20a. The starting value 20a can thus be attained particularly rapidly. The diagram 12ii shows a linear setpoint value variation with a constant slope. The occurring accelerations are lower. For the user, operating comfort can thus be improved. The diagrams 12iii to 12v show further possible characteristics in the case of a change of setpoint value, the characteristic of diagram 12iii having a less abrupt variation. The diagrams 12iv and 12v show an overshooting characteristic of the setpoint value variation, which can have a positive effect upon the starting behavior. The time period of the transitions shown here may again be variable. The characteristics shown here can be appropriately selected by the percussion mechanism unit 10a in dependence on types of operation and operating conditions.

Figure 13:
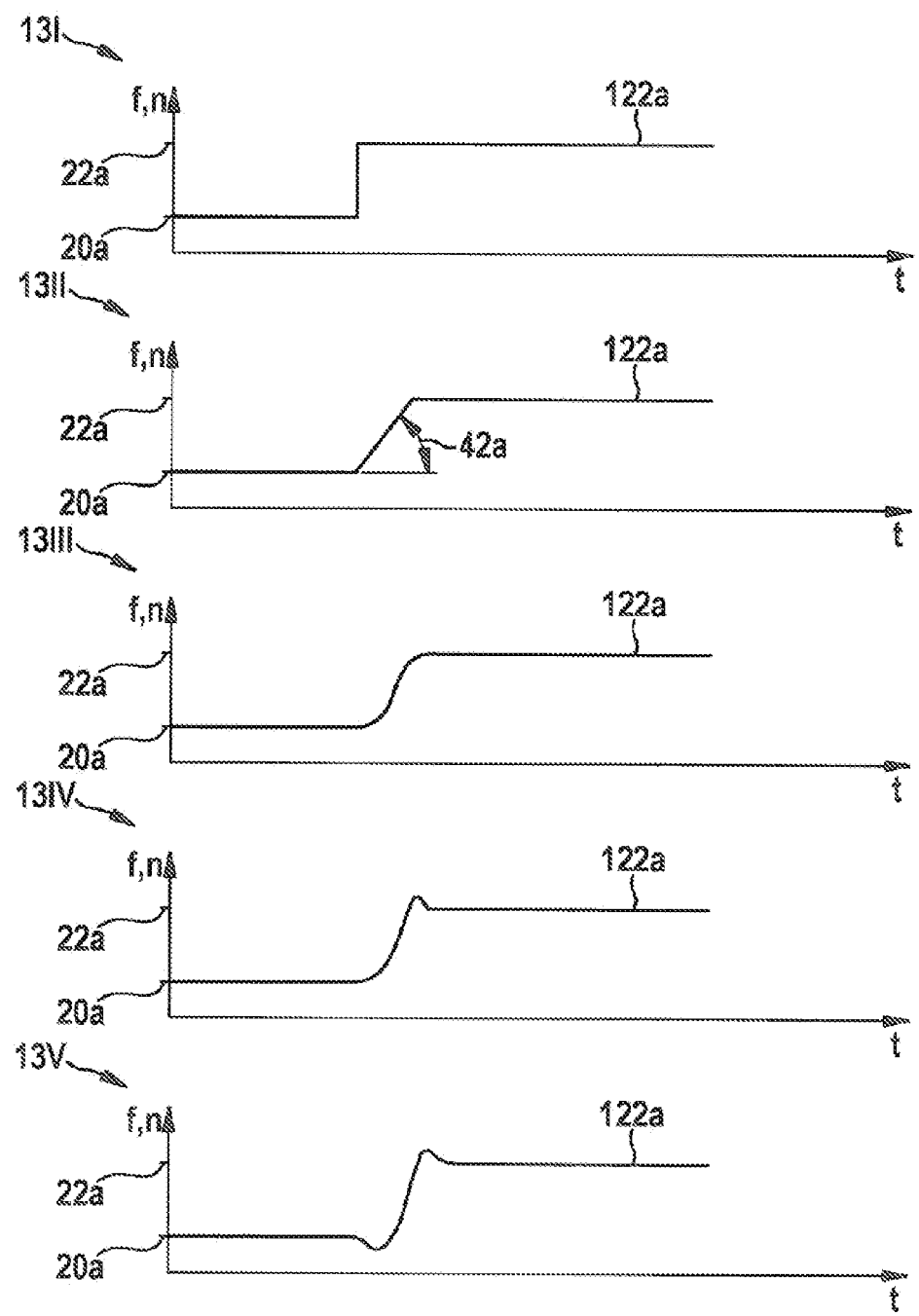

The transition of the setpoint rotational speed 122a from the starting value 20a to the working value 22a may likewise have differing characteristics, depending on a type of operation. These characteristics are represented in FIG. 13, in the diagrams 13*i*-13*v*. The diagram 13*i* shows a direct jump of the setpoint rotational speed 122*a* from the starting value 20*a* to the working value 22*a*. The working value 22*a* can thus be attained particularly rapidly. The diagram 13*ii* shows a linear setpoint value variation with a constant slope. The delay parameter 42*a* determines the slope of the setpoint value variation. The occurring accelerations are lower. The starting of the percussion mechanism is particularly reliable. The diagrams 13*iii* to 13*v* show further possible characteristics in the case of a change of setpoint value, the characteristic of diagram 13*iii* having a less abrupt variation. The diagrams 13*iv* and 13*v* show an overshooting characteristic of the setpoint variation. The time period 44*a* of the transitions shown here may again be variable. The characteristics shown here can be appropriately selected by the percussion mechanism unit 10*a* in dependence on types of operation and operating conditions. In particular, the percussion mechanism unit 10*a* can set the characteristics in dependence on a work-operation selection 124*a*. In the case of hammer drilling, it is advantageous for the percussive intensity to be increased gently. The set time period 44*a* is longer, for example in the range of from 0.8 to 1.2 seconds. In the case of chipping, the selected percussive intensity must be rapidly available. A short time period 44*a* is set, advantageously in the range of from 0.1 to 0.5 seconds. The user can also directly set the time period 44*a* via an operating element, not represented in greater detail here. Optionally, the time period is set in dependence on a working position, for example shorter than 0.5 seconds in the case of a downwardly directed working position, and longer than 1 second in the case of an upwardly directed working position.

In a further operating mode, the percussive operating state is started from standstill. The setpoint rotational speed 122*a* is increased to the working value 22*a* during the time period 44*a*. If a sufficiently long time period 44*a* is selected, a change from the idling operating state to the percussive operating state occurs before the limit value 104*a* has been exceeded. There is no need for the starting value 20*a* to be first set by the control unit 14*a* in order to start the percussion mechanism. The time period 44*a* can be learned. If a change from the idling operating state to the percussive operating state from standstill is unsuccessful, a longer time period 44*a* is selected upon the next change from the idling operating state to the percussive operating state from standstill.

The following description and the drawings of further exemplary embodiments are limited substantially to the differences between the exemplary embodiments and, in principle, reference may also be made to the drawings and/or the description of the other exemplary embodiments in respect of components having the same designation, in particular in respect of components having the same reference numerals. To differentiate the exemplary embodiments, the letters b-d have been appended to the references of the further exemplary embodiments, instead of the letter a of the first exemplary embodiment.

Figure 14:
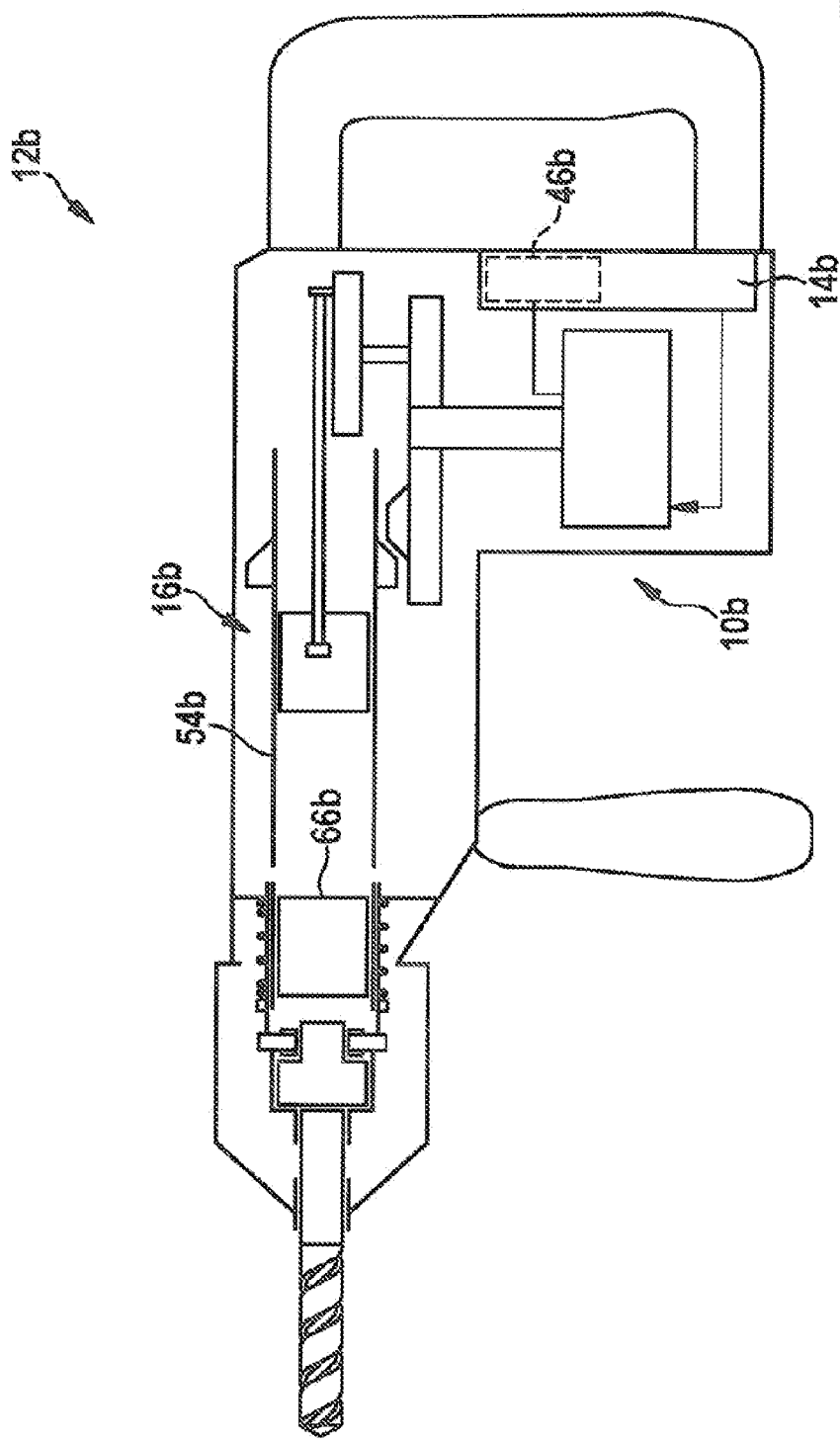
Figure 15:
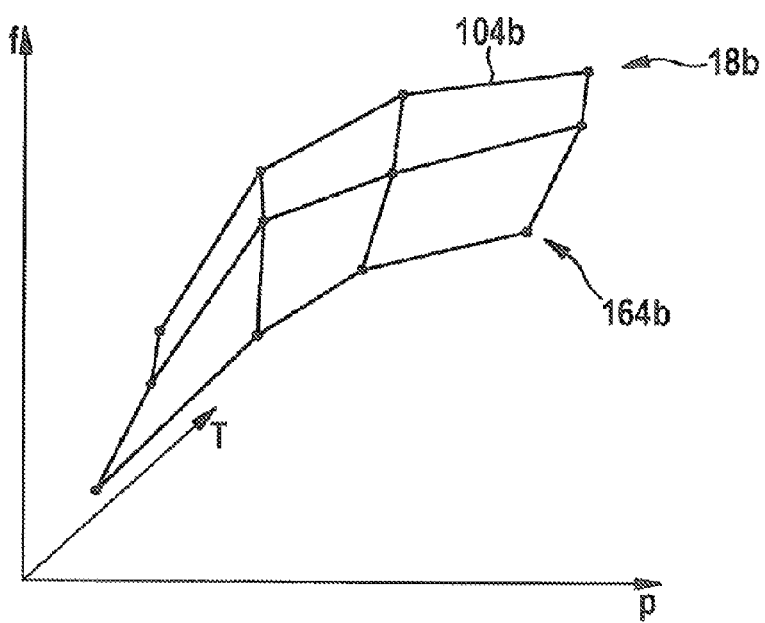

FIG. 14 shows a percussion mechanism unit 10*b* for a rotary and percussion hammer 12*b*, having a control unit 14*b* provided to control a pneumatic percussion mechanism 16*b* by open-loop and closed-loop control, in a second exemplary embodiment. The percussion mechanism unit 10*b* differs from the previous exemplary embodiment in that, in particular, it has an operating-condition sensor unit 46*b*. The control unit 14*b* is provided to process a measured quantity of the operating-condition sensor unit 46*b*. In particular, the control unit 14*b* is provided to determine a limit value 104*b* for a reliable starting of the percussion mechanism (FIG. 15). The operating-condition sensor unit 46*b* is provided to sense a temperature T and an ambient pressure P. The operating-condition sensor unit 46*b* is integrated as a module on a circuit board of the control unit 14*b*. The operating-condition sensor unit 46*b* senses an ambient temperature. The temperature affects a viscosity of lubricants, and a friction of a striker 66*b* with the hammer tube 54*b*. The ambient pressure affects, in particular, a return movement of the striker 66*b* and a limit value 104*b* for a reliable starting of the percussion mechanism. The control unit 14*b* is further provided to define operating parameters 18*b* of the percussion mechanism 16*b*. The operating parameter 18*b* is, in particular, a setpoint percussion rate and/or setpoint percussion-mechanism rotational speed. The control unit 14*b* defines the operating parameters, in particular, in dependence on pressure and/or temperature. The control unit 14*b* can determine a plurality of setpoint percussion rates, such as a setpoint percussion rate as a working value for a particularly efficient percussive operating state, and a setpoint percussion rate as a starting value for a starting of the percussion mechanism. The starting value and the working value are defined in dependence on the limit value 104*b*, and in particular the working value is defined so as to be greater than, and the starting value is defined so as to be less than, the limit value 104*b*. In a further operating mode, the user can use a rotary wheel, not represented in greater detail here, to set a relative working value between 0 and 1, which is then multiplied by the pressure-dependent and/or temperature-dependent setpoint percussion rate for the percussive operating state. The user can thus determine the percentage with which the pressure-dependent and/or temperature-dependent setpoint percussion rate of the percussive operating state is to be effected. In the present example, the control unit 14*b* defines the operating parameter 18*b* in dependence on a family of characteristics 164*b* stored in the control unit 14*b* (FIG. 15). The family of characteristics 164*b* shows the limit value 104*b* in dependence on the temperature T and the ambient pressure P. Intermediate values are interpolated appropriately by the control unit 14*b*. If the working value and the starting value are not to be calculated, further families of characteristics, not represented here, may be provided for these values. The control unit 14*b* sets the starting value for the starting of the percussion mechanism if a working value is selected that is higher than the starting value for the current temperature T and the current ambient pressure P. Since the control unit 14*b* uses the operating-condition sensor unit 46*b* to determine the operating parameters 18*b*, there is no need for a percussion sensor unit for identifying a percussive operating state. In the case of a change of an operating mode from an idling mode to a percussion mode, operation of the percussion mechanism occurs with sufficient reliability within the limits of the operating parameters 18*b* determined by means of the operation sensor unit 46*b*.

Figure 16:
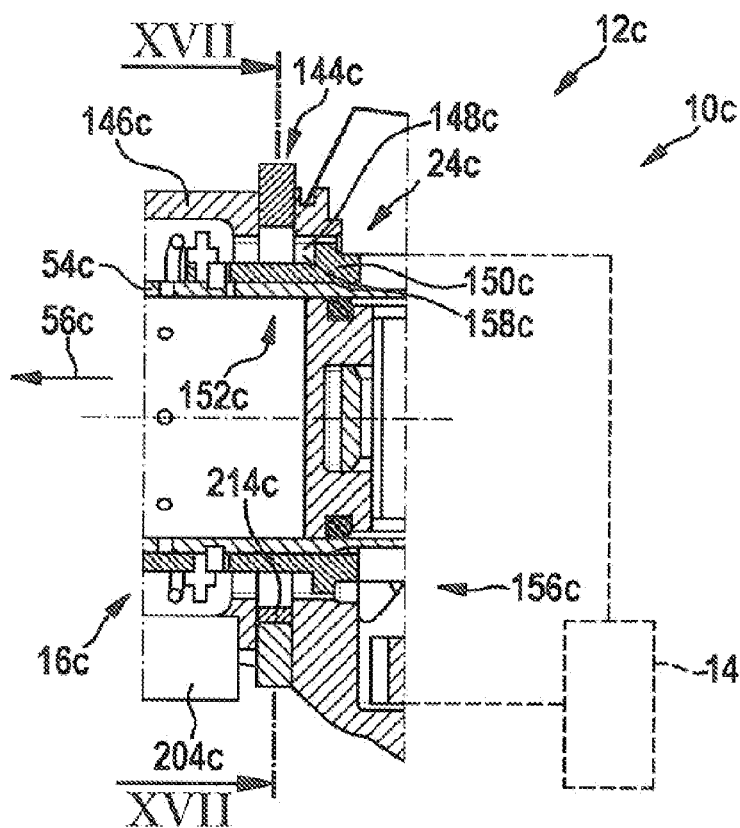
Figure 17:
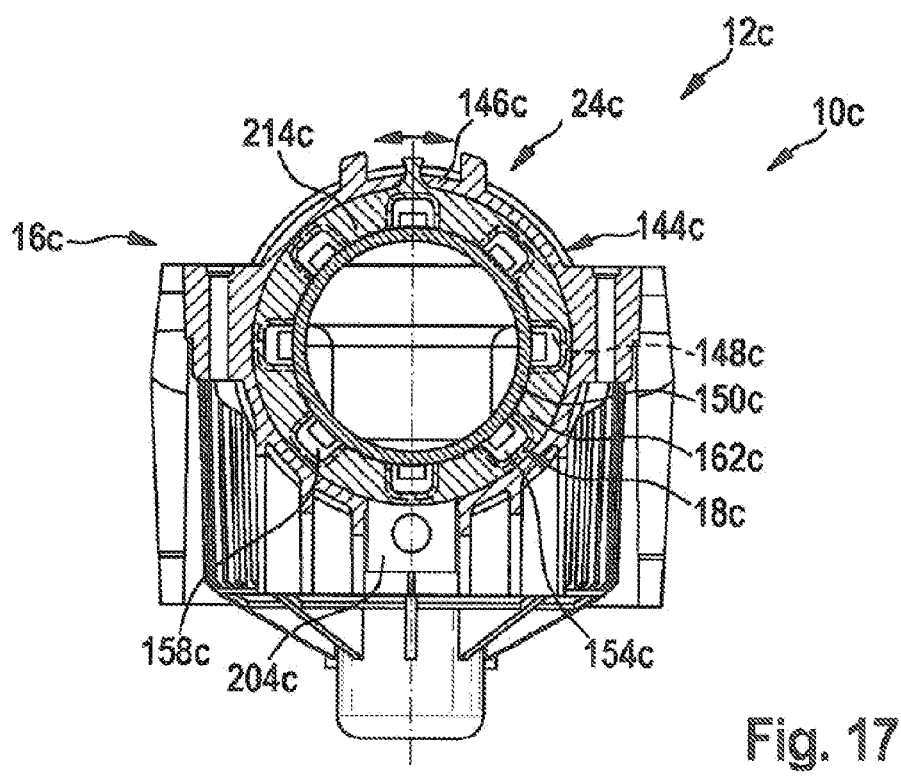

FIG. 16 and FIG. 17 show a percussion mechanism unit 10*c* in a further exemplary embodiment. The percussion mechanism unit 10*c* differs from the preceding percussion mechanism unit 10*b* in that an operating parameter 18*c* defined by a control unit 14*c* is a throttle characteristic quantity of a venting unit 24*c*. A percussion space in a hammer tube is delimited by a striking pin and a striker. The venting unit 24*c* has venting openings in the hammer tube 54*c* for venting the percussion space. The venting unit 24*c* serves to balance the pressure of the percussion space with an environment of a percussion mechanism 16c. The venting unit 24c has a setting unit 144c. The setting unit 144c is provided to influence venting of the percussion space, disposed in front of the striker in a percussion direction 68c, during a percussion operation. The hammer tube 54c of the percussion mechanism 16c is mounted in a transmission housing 146c of the rotary and percussion hammer 12c. The transmission housing 146c has ribs 148c, which are disposed in a star configuration and face toward an outside of the hammer tube 54c. Pressed in between the hammer tube 54c and the transmission housing 146c, in an end region 152c that faces toward an eccentric gear mechanism, there is a bearing bush 150c, which supports the hammer tube 54c on the transmission housing 146c. The bearing bush 150c, together with the ribs 148c of the transmission housing 146c, forms air channels 154c, which are connected to the venting openings in the hammer tube 54c. The air channels 154c constitute a part of the venting unit 24c. The percussion space is connected, via the air channels 154c, to a transmission space 156c disposed behind the hammer tube 54c, against the percussion direction 68c. The air channels 154c constitute throttle points 158c, which influence a flow cross section of the connection of the percussion space to the transmission space 156c. The setting unit 144c is provided to set the flow cross section of the throttle points 158c. The air channels 154c constituting the throttle points 158c constitute a transition between the percussion space and the transmission space 156c. A setting ring 214c has inwardly directed valve extensions 162c disposed in a star configuration. Depending on a rotary position of the setting ring 214c, the valve extensions 162c can fully or partially overlap the air channels 154c. The flow cross section can be set by adjustment of the setting ring 214c. The control unit 14c adjusts the setting ring 214c of the setting unit 144c by rotating the setting ring 214c by means of a servo drive 204c. If the venting unit 24c is partially closed, the pressure in the percussion space that is produced upon a movement of the striker in the percussion direction 68c can escape only slowly. A counter-pressure forms, directed against the movement of the striker in the percussion direction 68c. This counter-pressure assists a return movement of the striker, against the percussion direction 68c, and thereby assists a starting of the percussion mechanism. If the value selected for the percussion-mechanism rotational speed is an above-critical working value at which reliable starting of the percussion mechanism is not possible with the venting unit 24c open, the control unit 14c partially closes the venting unit 24c, for the purpose of changing from an idling operating state to a percussive operating state. Starting of the percussive operating state is assisted by the counter-pressure in the percussion space. After the percussion mechanism has been started, the control unit 14c opens the venting unit 24c again. The control unit 14c can also use the operating parameter of the throttle characteristic quantity of the venting unit 24c for the purpose of regulating output.

Figure 18:
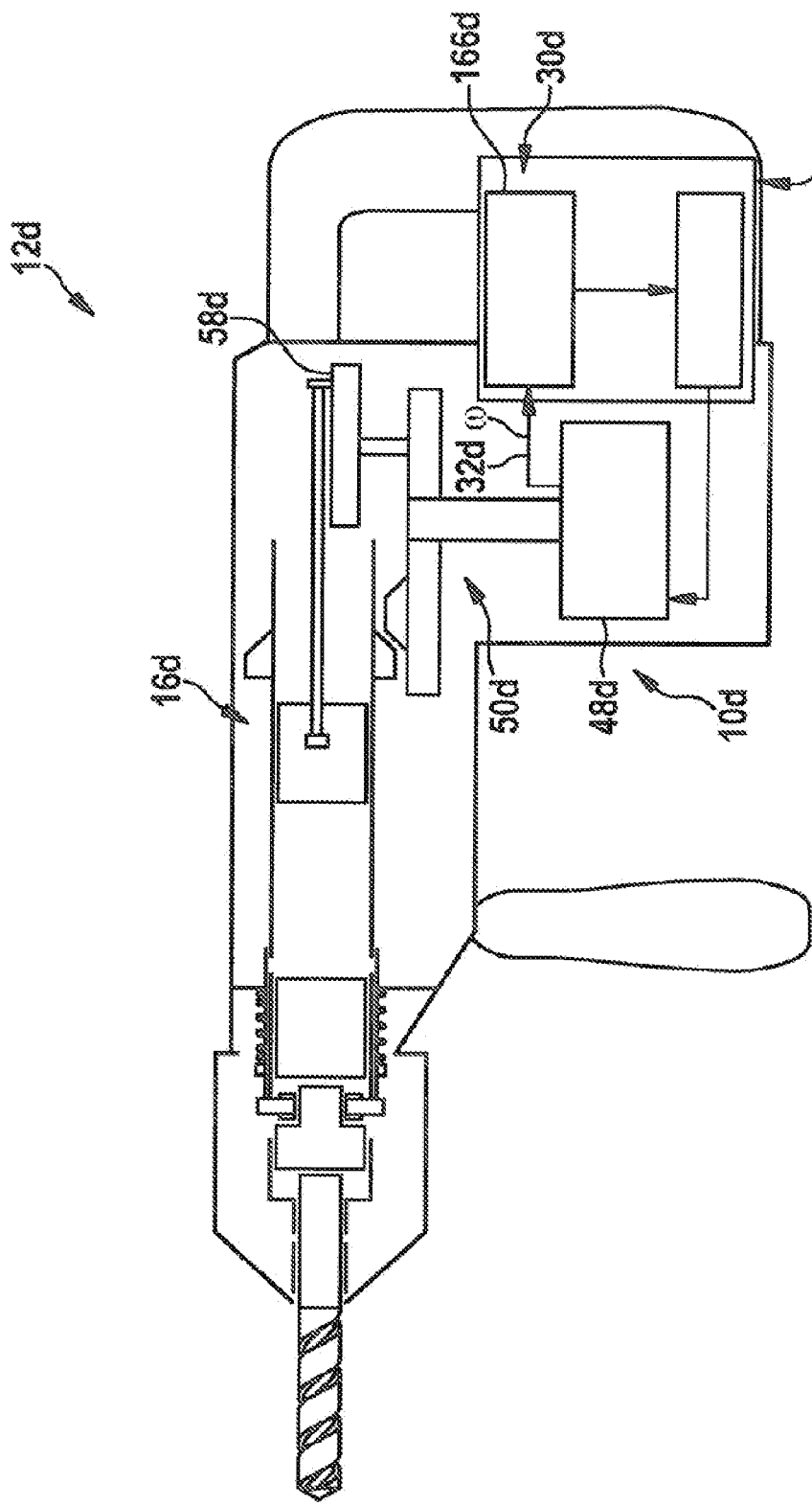

FIG. 18 shows a percussion mechanism unit 10d comprising a control unit 14d for a percussion mechanism 16d, in a fourth exemplary embodiment. The percussion mechanism unit 10d differs from the first exemplary embodiment in that, in particular, a percussion sensor unit 30d is provided to identify a percussive operating state by evaluation of at least one drive parameter 32d. For this purpose, the percussion sensor unit 30d has a load estimator 166d. The load estimator 166d is integrated with the percussion sensor unit 30d on the control unit 14d, and is provided to estimate an unknown drive load $f_L$, using a measured motor rotational speed ω of the motor 48d. The unknown drive load $f_L$ is an unknown load moment $M_L$ acting upon the motor 48d.

A total moment M denotes the sum of all moments acting on the motor 48d. M comprises a drive moment of the motor $M_M$ and the unknown load moment $M_L$. J is the rotational inertia of all parts of the motor 48d, a transmission unit 50d and an eccentric gear mechanism 58d that rotate with ω, wherein the transmission ratios must be taken into account. The following principle of angular momentum then applies:

$$J\frac{d\omega(t)}{dt} = \sum M$$

The total moment M is the sum of a moment $M_M$ of the motor 48d and of moments $M_{Li}$ of loads acting upon the motor 48d:

$$J\frac{d\omega(t)}{dt} = M_M + M_{L1} + M_{L2} + \ldots$$

The motor rotational speed ω can be represented as a function of time ω(t), which is composed of a basic rotational speed $\omega_0$ that does not change, or that changes only slowly, and of rapidly changing, highly dynamic components $f_i(t)$, and of the sought drive load $f_L$:

$$\omega(t)=\omega_0+f_1(t)+f_2(t)+\ldots+f_L$$

The functions $f_i(t)$ describe known loads. This equation is obtained by integration of the principle of angular momentum, and consequently the functions f do not have the dimension of a torque and are therefore denoted by the letter f instead of M. The procedure is known to persons skilled in the art. The load to be estimated $f_L$ can be obtained by subtracting the known quantities from the measured motor rotational speed ω(t). In this case, $f_M(t)$ is the function of the moment $M_M$ of the motor 48d:

$$f_L=\omega(t)-\omega_0-f_M(t)-f_1(t)-f_2(t)-\ldots$$

The known load components $f_i(t)$ describe, in particular, rotational speed fluctuations caused by variable transmission ratios, motor cyclic irregularities and an irregular voltage supply, e.g. by an activation of the motor. A distinction may be made between time-periodic loads $f_i(t)$ and angle-periodic loads $f_i(\Phi)$. A time-periodic load $f_i(t)$ may be, for example, a voltage fluctuation, in particular having double the grid frequency of an electric power supply to the rotary and percussion hammer 12d, and an angle-periodic load $f_i(\Phi)$ may be, for example, a transmission ratio that changes with a rotary position of the eccentric gear mechanism 58d. Loads whose characteristic is known precisely will be stored as a computational rule on the control unit 14d by persons skilled in the art. A percussive operating state is identified if $f_L$ exceeds a defined or settable threshold value and signals this to the control unit 14d. The further functions and the application of the percussion sensor unit 30d are as in the first exemplary embodiment.

The invention claimed is:
1. A percussion mechanism unit, comprising:
 a control unit configured to control a pneumatic percussion mechanism by one or more of open-loop control and closed-loop control,
 wherein, in at least one operating state in which an operating parameter is set at an above-critical working value, the control unit is configured to set the operating parameter temporarily to a starting value in order to change from an idling operating state to a percussive operating state, wherein the operating parameter is a percussion frequency of the percussion mechanism unit that drives a striker that is coupled to the percussion mechanism unit and the starting value lies in a frequency range below a critical working value frequency in which an amplitude of oscillation for the striker has a single value based on a predetermined relationship of the percussion frequency at the starting value to the amplitude of the striker, and wherein the above-critical working value is set to a percussion frequency of the striker in the percussion mechanism unit at a frequency that is above the critical working value frequency in a frequency range in which the amplitude of oscillation for the striker corresponds to a plurality of values based on the predetermined relationship of the percussion frequency at the above-critical working value to the amplitude of the striker.

2. The percussion mechanism unit as claimed in claim 1, wherein the control unit is configured to set the operating parameter to an above-critical working value in the idling operating state.

3. The percussion mechanism unit as claimed in claim 1, wherein the control unit is configured to set the operating parameter directly to the working value in order to change from the idling operating state to the percussive operating state.

4. The percussion mechanism unit as claimed in claim 1, wherein the operating parameter is a percussion frequency.

5. The percussion mechanism unit as claimed in claim 4, wherein the control unit is configured to lower one or more of the percussion frequency and the percussion-mechanism rotational speed temporarily to a starting value, in at least one operating state, in order to change from the idling operating state to the percussive operating state.

6. The percussion mechanism unit as claimed in claim 1, further comprising an operation change sensor configured to signal a change of an operating mode.

7. The percussion mechanism unit as claimed in claim 1, further comprising a percussion sensor unit configured to signal a percussive operating state.

8. The percussion mechanism unit as claimed in claim 7, wherein the percussion sensor unit is further configured to identify the percussive operating state by evaluation of at least one drive parameter.

9. The percussion mechanism unit as claimed in claim 7, wherein the percussion sensor unit has at least one sensor for a mechanical measured quantity, the sensor being configured to detect the percussive operating state.

10. The percussion mechanism unit as claimed in claim 7, wherein the percussion sensor unit has at least one filter unit configured to isolate a signal component out of a sensor signal of the sensor.

11. The percussion mechanism unit as claimed in claim 1, wherein the control unit has a learning mode configured to determine the critical value of the operating parameter.

12. The percussion mechanism unit as claimed in claim 11, wherein, in the learning mode, the control unit stores the critical value of the operating parameter in the case of a successful starting of the percussion mechanism.

13. The percussion mechanism unit as claimed in claim 1, wherein the control unit has at least one delay parameter configured to influence a time period for a change between two values of the operating parameter.

14. The percussion mechanism unit as claimed in claim 1, further comprising an operating-condition sensor unit.

15. The percussion mechanism unit as claimed in claim 14, wherein the control unit is configured to process a measured quantity of the operating-condition sensor unit.

16. The percussion mechanism unit as claimed in claim 1 wherein the percussion mechanism unit is incorporated into a hand power tool.

17. A method for operating a pneumatic percussion mechanism including a percussion mechanism unit, comprising:

setting at least one operating parameter temporarily to a starting value, in at least operating state, in order to change from an idling operating state to a percussive operating state, wherein the operating parameter is a percussion frequency of the percussion mechanism unit that drives a striker that is coupled to the percussion mechanism unit and the starting value lies in a frequency range below a critical working value frequency in which an amplitude of oscillation for the striker has a single value based on a predetermined relationship of the percussion frequency at the starting value to the amplitude of the striker, and wherein the above-critical working value is set to a percussion frequency of the striker in the percussion mechanism unit at a frequency that is above the critical working value frequency in a frequency range in which the amplitude of oscillation for the striker corresponds to a plurality of values based on the predetermined relationship of the percussion frequency at the above-critical working value to the amplitude of the striker.

18. The percussion mechanism unit as claimed in claim 1, wherein the percussion mechanism is configured for one or more of a rotary hammer and a percussion hammer.

19. A percussion mechanism unit comprising:

a percussion sensor unit configured to generate an output corresponding to a measured acceleration in a transmission housing associated with a pneumatic percussion mechanism; and a control unit operatively connected to the percussion sensor unit, the control unit being configured to control the pneumatic percussion mechanism using at least one of open-loop control and closed-loop control, wherein the control unit operates in a learning mode configured to isolate a signal component generated by the percussion sensor unit during operation of the pneumatic percussion mechanism and to learn a maximum critical working value frequency for stable operation of the percussion mechanism unit in a percussive operating state based on the signal component.

* * * * *